US006186650B1

(12) United States Patent
Hulse et al.

(10) Patent No.: US 6,186,650 B1
(45) Date of Patent: Feb. 13, 2001

(54) VEHICLE HEADLAMP WITH BEAMFORMING WAVEGUIDE

(75) Inventors: George R. Hulse; Lloyd Keith Bucher, both of Cookeville, TN (US)

(73) Assignee: Cooper Automotive Products, Inc., Houston, TX (US)

( * ) Notice: Under 35 U.S.C. 154(b), the term of this patent shall be extended for 0 days.

(21) Appl. No.: 09/109,052

(22) Filed: Jul. 2, 1998

Related U.S. Application Data

(63) Continuation-in-part of application No. 09/009,836, filed on Jan. 20, 1998.
(60) Provisional application No. 60/069,118, filed on Dec. 9, 1997.

(51) Int. Cl.$^7$ .................................................... F21V 9/00
(52) U.S. Cl. ..................... 362/511; 362/459; 362/487; 362/507; 362/509
(58) Field of Search ............................ 362/317, 326, 362/339, 487, 496, 506, 507, 509, 512, 513, 520, 511, 279–281, 319, 328, 329, 551, 554, 556, 459; 313/110; 359/831, 837

(56) References Cited

U.S. PATENT DOCUMENTS

Re. 33,722  10/1991  Scifres et al. ........................... 385/33
Re. 34,318   7/1993  Davenport et al. ................... 362/511

(List continued on next page.)

FOREIGN PATENT DOCUMENTS 2-113293   4/1990   (JP) .

OTHER PUBLICATIONS

Michael A. Marinelli, et al.; "Diode Lasers Light the Way for Automotive Signal Lamps"; Nov. 1997; Photonics Spectra.
Stuart Birch;"Lighter Moments"; Mar. 1997; Automotive Engineering.
Henning Hogrefe, et al.; "Improving Safety Through Adaptive Forward Lighting"; Oct. 1997; Automotive Engineering.
James Braham; "Bosch Lights Up: One Bulb, One Reflector, Two Beams"; Dec. 12, 1996; Machine Design.
George R. Hulse; "Focus–less Optics and their use in Automotive Distributed Lighting Systems"; Feb. 24–27, 1997; SAE Technical Paper Series 970252.
George R. Hulse, et al.; "Three Specific Design Issues Associated with Automative Distributed Lighting Systems: Size, Efficiency, and Reliability"; Feb. 26–29, 1996; SAE Technical Paper Series 960492.
George R. Hulse, et al.; "HID Driven Focus–less Optics System for Complete Automotive Distributed Lighting Systems"; SAE Technical Paper 980877, 1998.
George R. Hulse, et al.,; "Analysis of Waveguide Geometries at Bends and Branches for the Directing of Light" SAE Technical Paper, 1998.

Primary Examiner—Sandra O'Shea
Assistant Examiner—Ismael Negron
(74) Attorney, Agent, or Firm—Reising, Ethington, Barnes, Kisselle, Learman & McCulloch, P.C.

(57) ABSTRACT

A vehicle headlamp includes a beamforming waveguide having an input face, an output face, and a guide portion extending between the input face and the output face. A light source is positioned at the input face of the beamforming waveguide. A lens is positioned at the output face so that light output by the beamforming waveguide passes through the lens to provide vehicle forward illumination. The beamforming waveguide is shaped to generate a desired headlamp beam pattern and can be formed as a block of solid material, a bundle of plastic or glass fibers, or a solid molded wedge that can be moved between two positions to provide both high and low beam forward illumination.

23 Claims, 19 Drawing Sheets

U.S. PATENT DOCUMENTS

| | | | |
|---|---|---|---|
| 2,507,909 | 5/1950 | Kaysen | 40/547 |
| 3,683,167 | 8/1972 | Rishton | 362/581 |
| 3,962,702 | 6/1976 | Kriege | 340/815.43 |
| 4,151,582 | 4/1979 | Grunberger | 362/31 |
| 4,222,091 | 9/1980 | Barterbach | 362/565 |
| 4,345,303 * | 8/1982 | Gerard et al. | 362/512 |
| 4,428,029 | 1/1984 | Baliozian | 362/12 |
| 4,432,039 | 2/1984 | Cibie | 362/31 |
| 4,755,918 | 7/1988 | Pristash et al. | 362/301 |
| 4,767,172 | 8/1988 | Nicholas et al. | 385/146 |
| 4,824,194 | 4/1989 | Karasawa | 385/146 |
| 4,857,794 * | 8/1989 | Watanabe | 313/113 |
| 4,875,141 * | 10/1989 | Miyauchi et al. | 362/513 |
| 4,897,771 | 1/1990 | Parker | 362/298 |
| 4,945,457 | 7/1990 | Yazdani et al. | 362/101 |
| 5,042,892 | 8/1991 | Chiu et al. | 385/114 |
| 5,053,765 | 10/1991 | Sonehara et al. | 340/815.43 |
| 5,165,772 * | 11/1992 | Wu | 362/26 |
| 5,184,882 | 2/1993 | Davenport et al. | 362/54 |
| 5,184,883 * | 2/1993 | Finch et al. | 362/554 |
| 5,193,894 | 3/1993 | Lietar et al. | 362/466 |
| 5,257,168 | 10/1993 | Davenport et al. | 362/556 |
| 5,311,410 | 5/1994 | Hsu et al. | 362/452 |
| 5,341,445 | 8/1994 | Davenport et al. | 385/39 |
| 5,343,367 | 8/1994 | Davenport et al. | 362/558 |
| 5,363,469 | 11/1994 | Elderfield | 385/146 |
| 5,436,805 | 7/1995 | Hsu et al. | 362/559 |
| 5,436,806 * | 7/1995 | Kato | 362/554 |
| 5,499,166 | 3/1996 | Kato et al. | 362/511 |
| 5,499,168 | 3/1996 | Cochard et al. | 362/466 |
| 5,574,328 | 11/1996 | Okuchi | 313/114 |
| 5,601,354 | 2/1997 | Horii et al. | 362/551 |
| 5,615,090 | 3/1997 | Kato | 362/560 |
| 5,640,483 | 6/1997 | Lin | 385/146 |
| 5,685,627 | 11/1997 | Kato | 362/551 |
| 5,692,823 | 12/1997 | Okuchi | 362/551 |
| 5,730,519 | 3/1998 | Okuchi et al. | 362/559 |
| 5,769,525 * | 6/1998 | Daumueller et al. | 362/507 |
| 5,791,756 | 8/1998 | Hulse et al. | 362/554 |
| 5,812,714 | 9/1998 | Hulse | 385/39 |

* cited by examiner

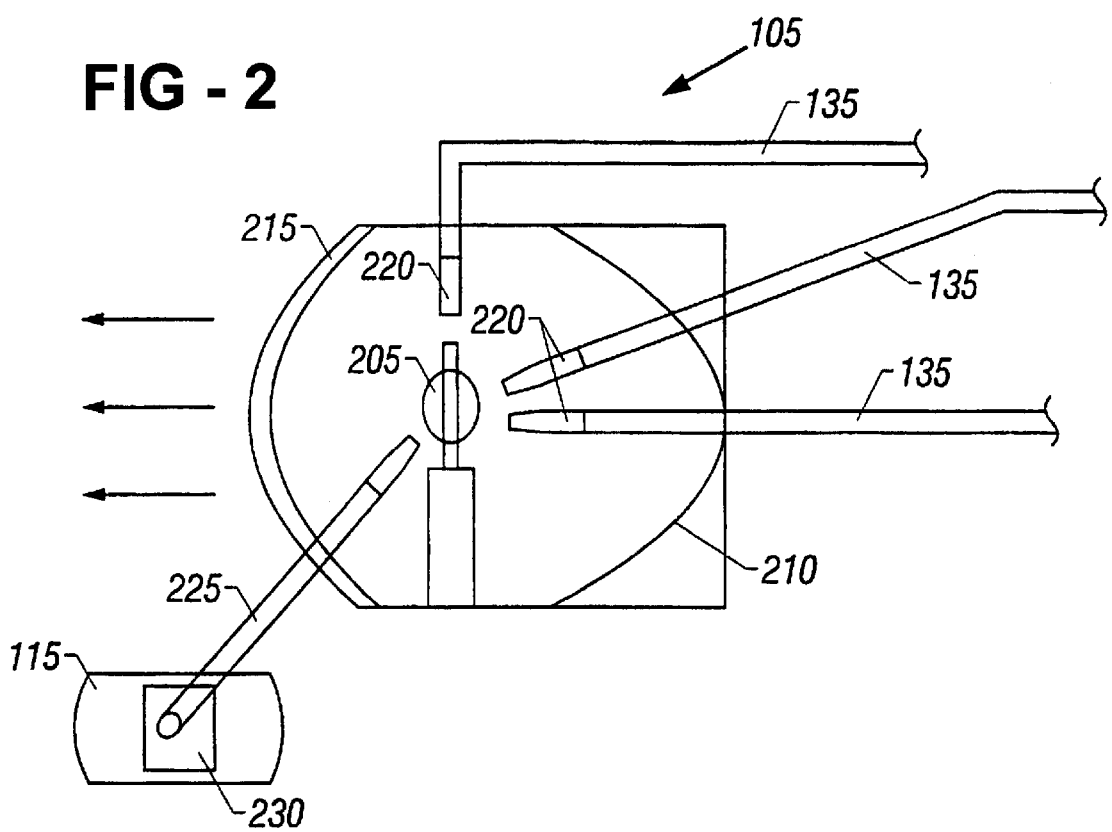
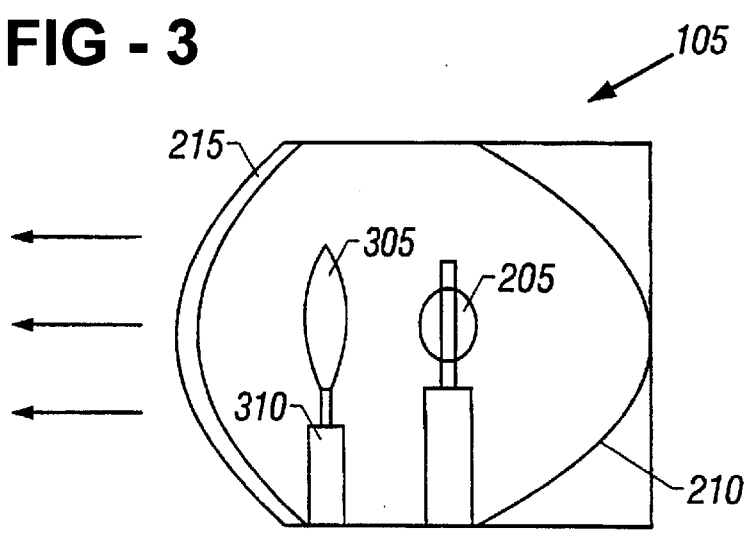

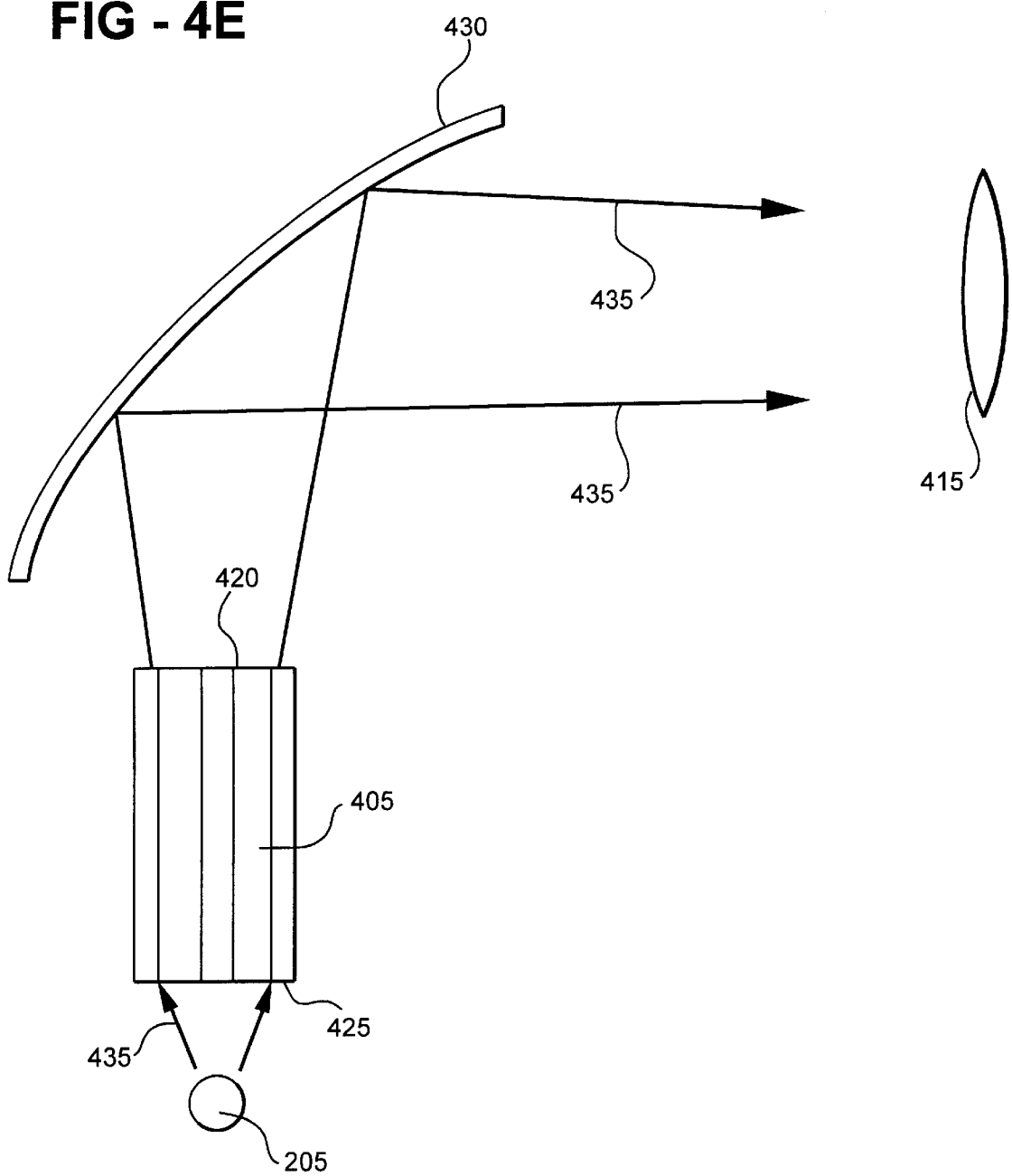

FIG - 6A ON
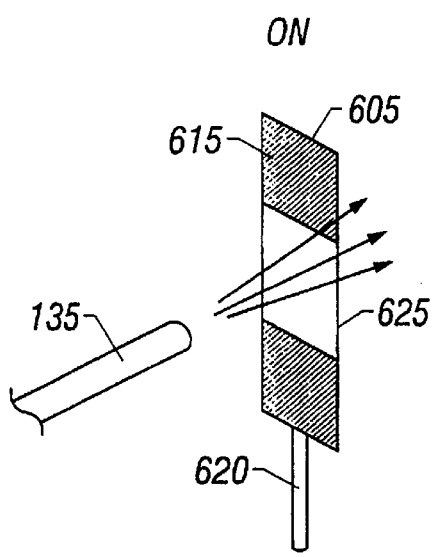
FIG - 6B OFF
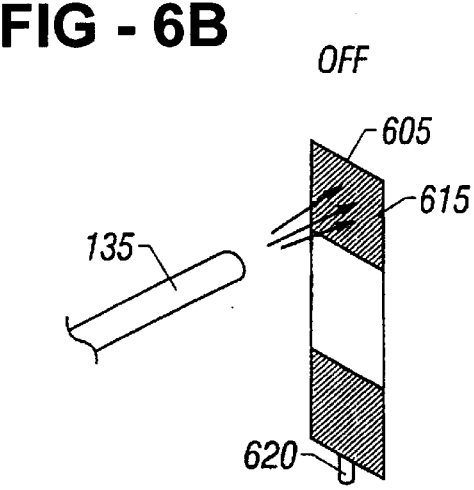
FIG - 6C ON
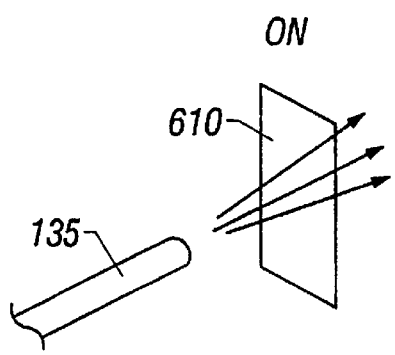
FIG - 6D OFF
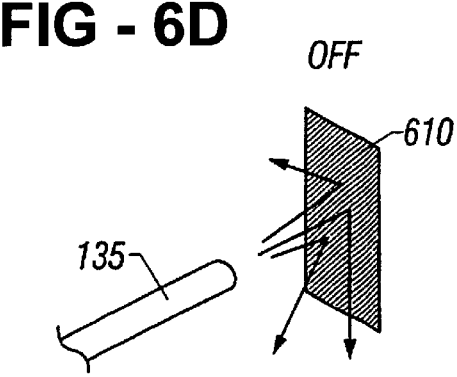

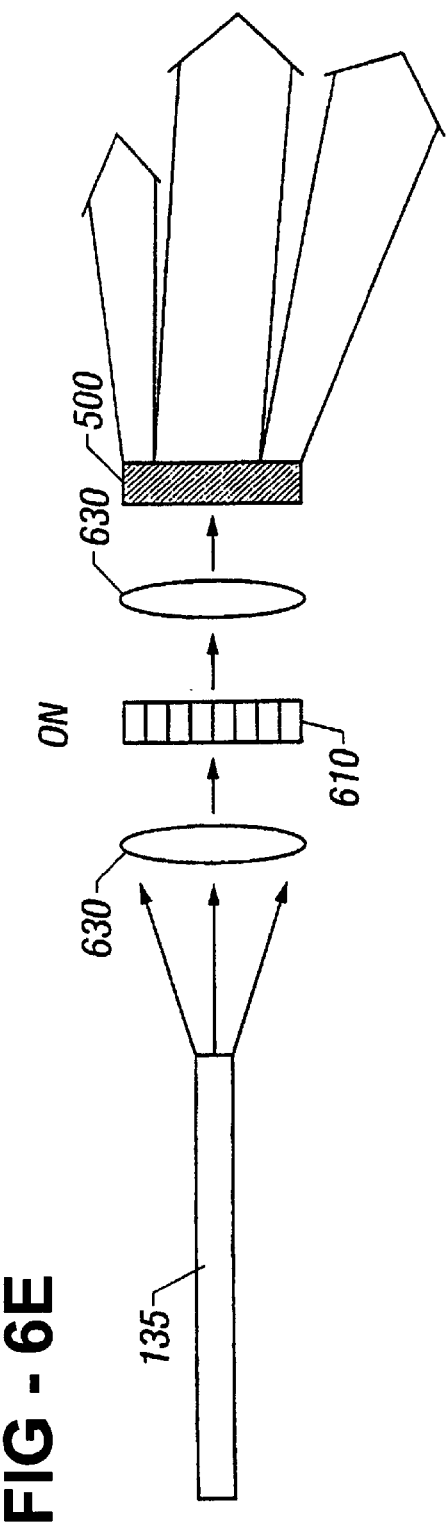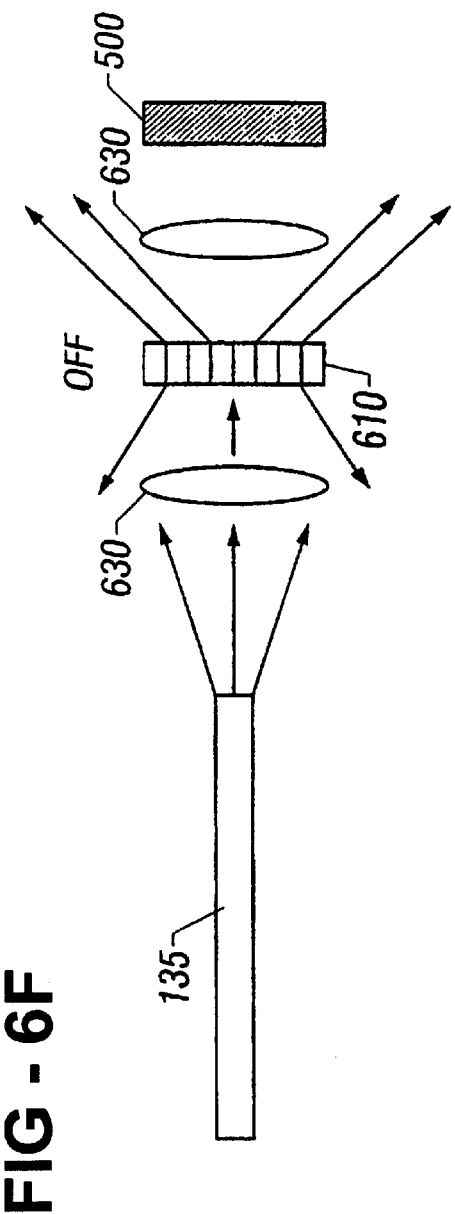

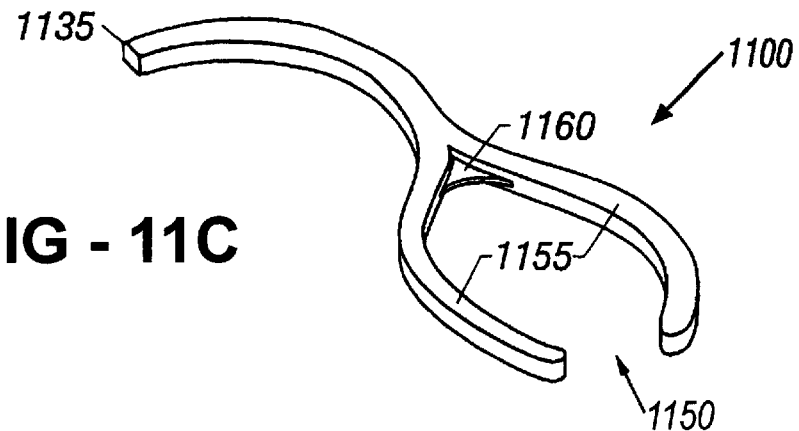
FIG - 11C
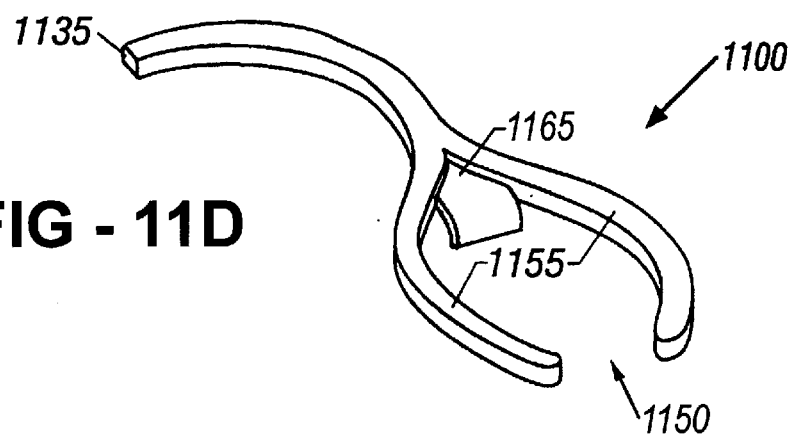
FIG - 11D
FIG - 11E
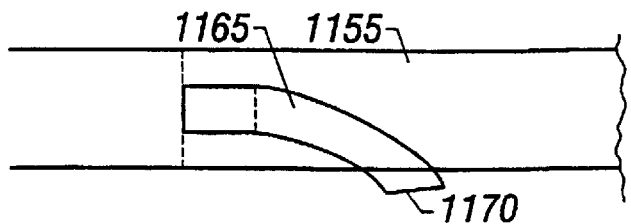

FIG - 15
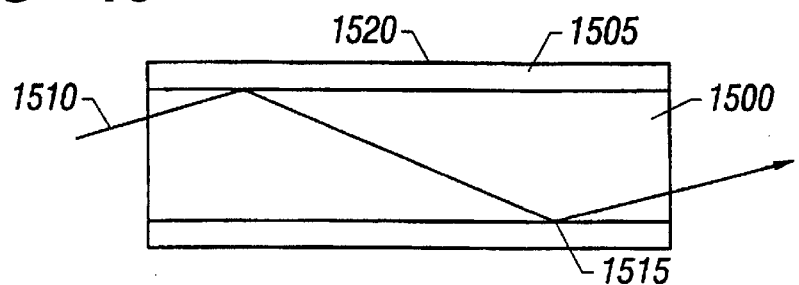
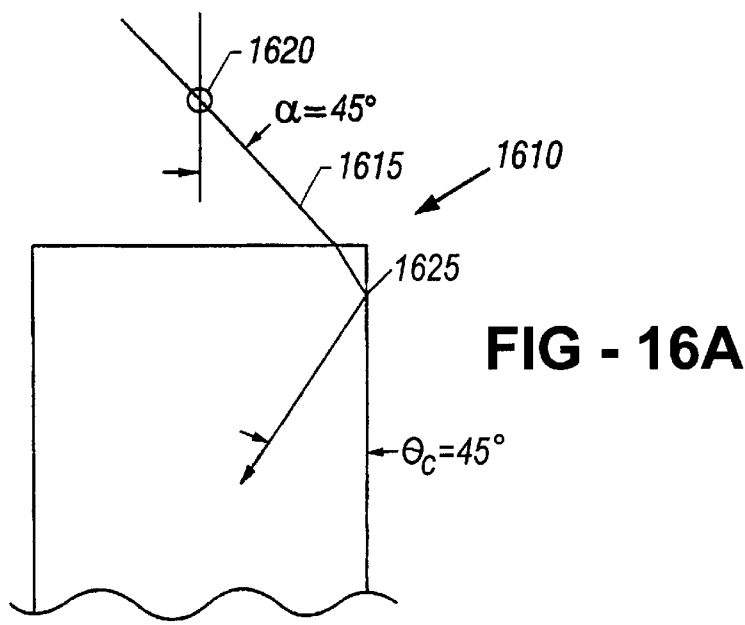
FIG - 16A
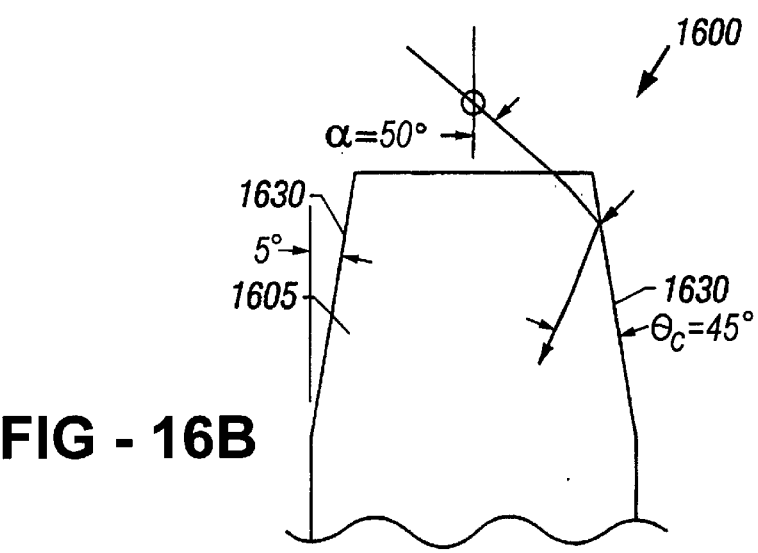
FIG - 16B

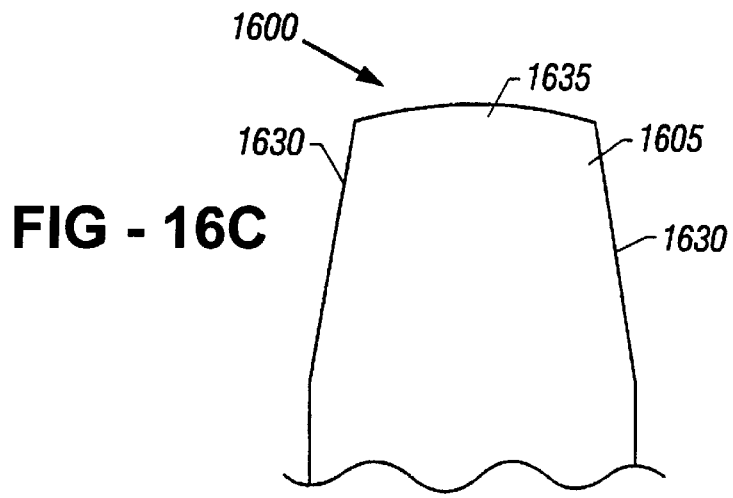
FIG - 16C
FIG - 17A
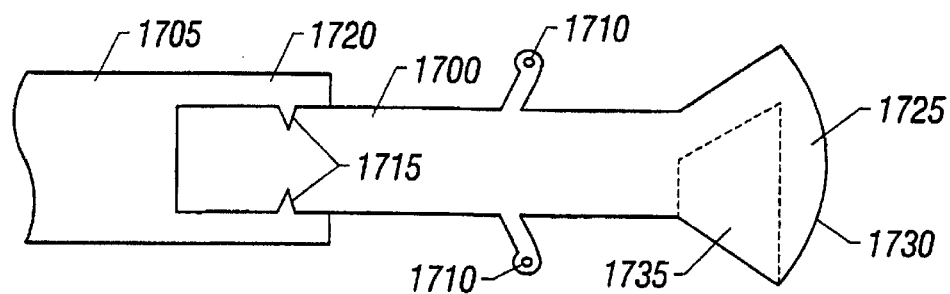
FIG - 17B
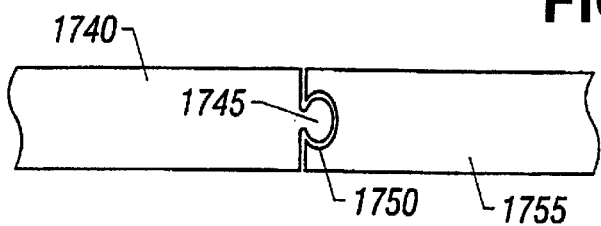
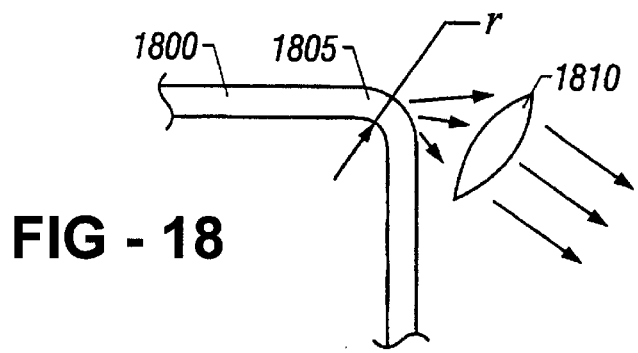
FIG - 18

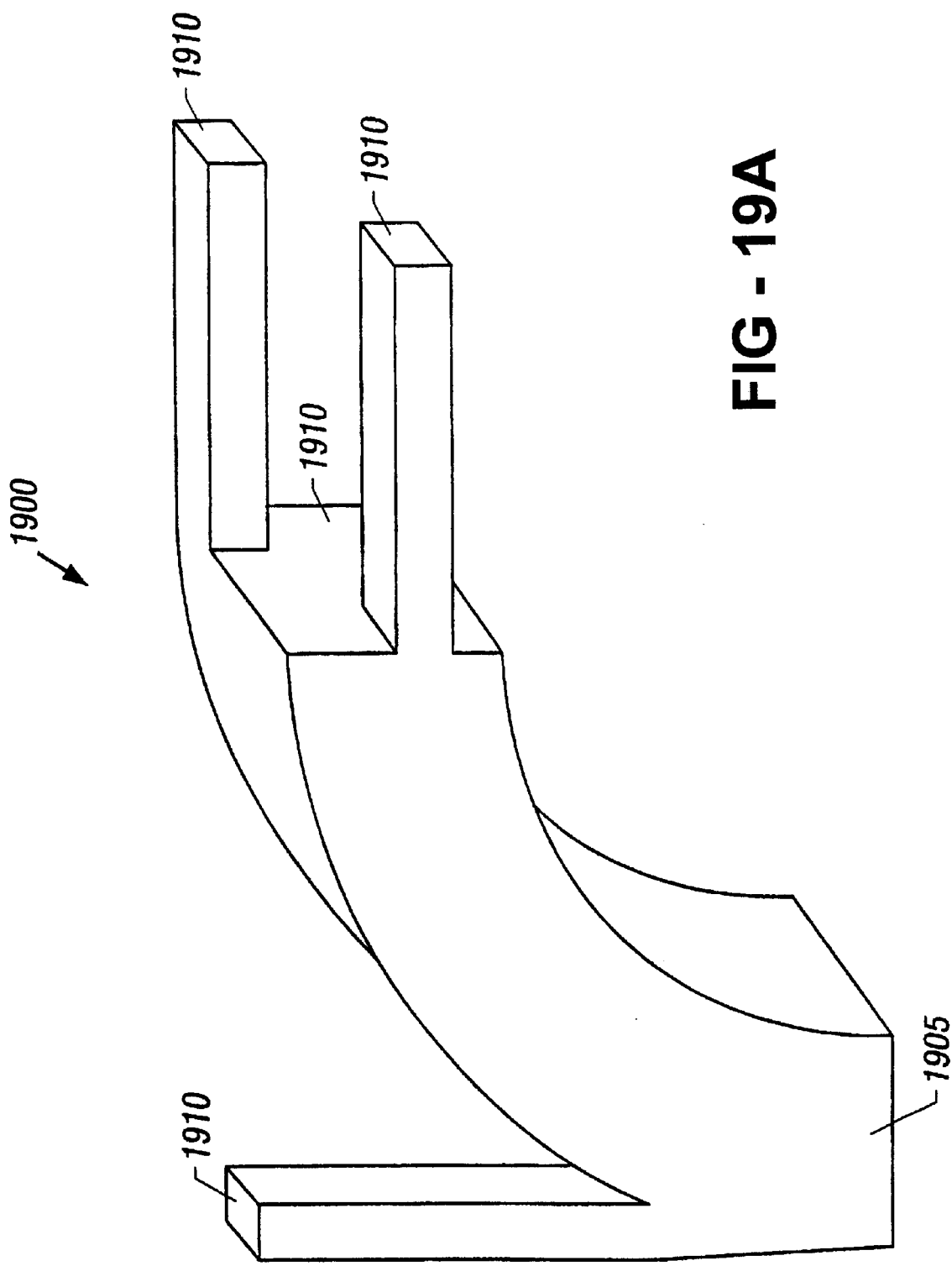

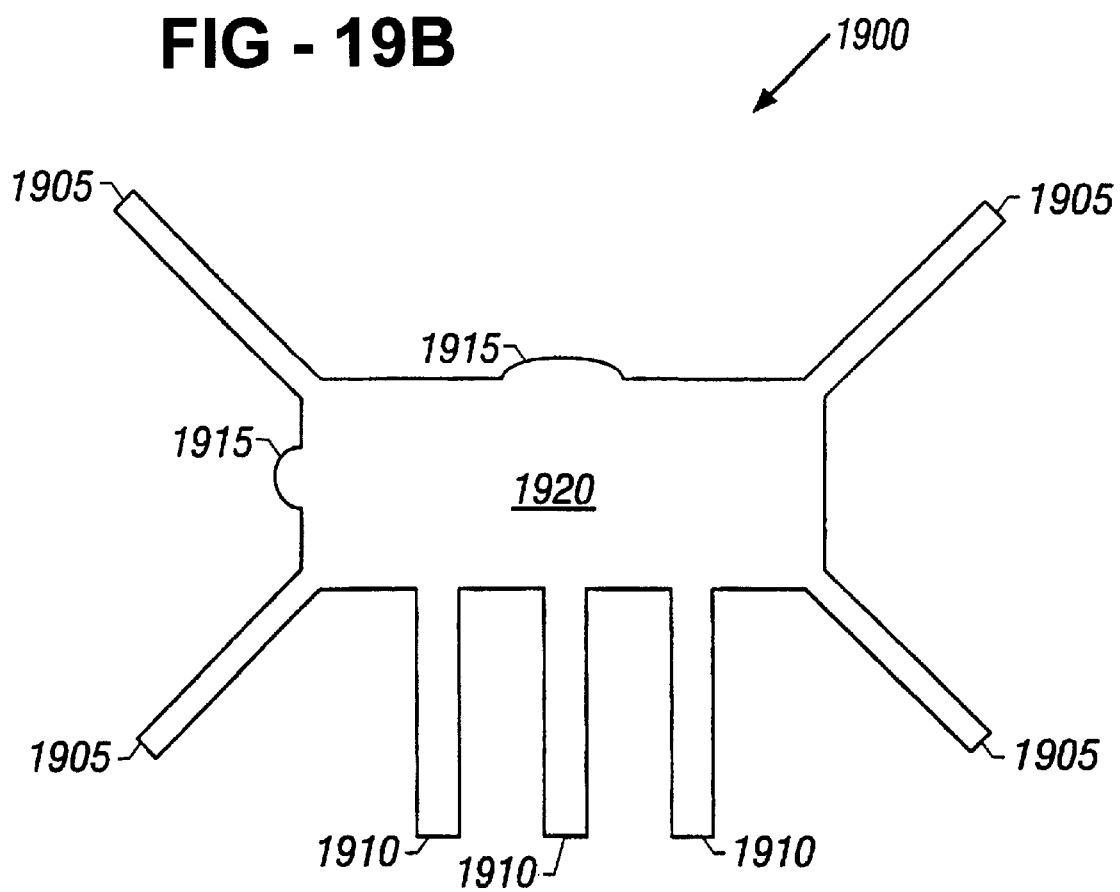

VEHICLE HEADLAMP WITH BEAMFORMING WAVEGUIDE

CROSS-REFERENCE TO RELATED APPLICATIONS

This application is a Continuation-in-Part (CIP) of application Ser. No. 09/009,836, filed Jan. 20, 1998, also it claims priority from Provisional application Ser. No. 60/069,118, "HID DRIVEN FOCUS-LESS OPTICS SYSTEM," filed Dec. 9, 1997 both of which are incorporated by reference.

BACKGROUND

The invention relates to distributed lighting systems.

Distributed lighting systems distribute light from one or more light sources in central or strategic locations to one or more remote locations. A distributed lighting system promises several advantages over conventional lighting techniques, including low power consumption, extended life, heat reduction where the light is emitted, and increased design flexibility.

SUMMARY

The invention provides a distributed lighting system (DLS) for use, for example, in an automobile. Issues associated with incorporating a distributed lighting system into an automobile are discussed by Hulse, Lane, and Woodward in "Three Specific Design Issues Associated with Automotive Distributed Lighting Systems: Size, Efficiency and Reliability," SAE Technical Paper Series, Paper No. 960492, which was presented at the SAE International Congress and Exposition, Detroit, Mich., Feb. 26–29, 1996 and Hulse and Mullican in "Analysis of Waveguide Geometries at Bends and Branches for the Directing of Light," SAE Technical Paper Series, Paper No. 981189, which are incorporated herein by reference.

A practical distributed lighting system for an automobile must address size, efficiency, and reliability issues. To this end, such a system may employ focus-less optics components, such as collector elements and waveguides. These components are inexpensive to manufacture, since they can be formed from plastic (acrylic, for example) in an injection molding process. In addition, they have high collecting efficiency and are very compact. For example, a collector element may be smaller than one cubic inch (16.4 cubic centimeters). Components that must handle high heat levels (e.g., components are placed in proximity to the light source) may require a ventilation system or may include portions formed from heat resistant materials, such as glass or Pyrex™.

The DLS may incorporate different types of optical waveguide structures to distribute light throughout the vehicle, including joints, elements with epoxy coatings, pinched end collector portions, integrated installation snaps, integrated input optics and integrated output lenses. The DLS may also include waveguide structures to provide illumination to portions of the vehicle interior, including cup holders, assist grips, storage pockets, step-up boards and running boards.

In one aspect, generally, a vehicle headlamp includes a beamforming waveguide formed from a block of solid material. The waveguide has an input face, an output face, and a guide portion extending between the input face and the output face. A light source is positioned at the input face of the beamforming waveguide. A lens is positioned at the output face so that light output by the beamforming waveguide passes through the lens to provide vehicle forward illumination.

Embodiments may include one or more of the following features. The guide portion may have a uniform cross-section along a length of the guide portion from the input face to the output face. The guide portion may include a top surface having a first stepped portion that forms a thickness profile to control an output beam pattern of the waveguide. The guide portion also may include a second stepped portion and an inclined portion that forms a transition between the first stepped portion and the second stepped portion. The input and output faces of the waveguide may be planar surfaces and the stepped portions may be perpendicular to the input face and the output face.

The guide portion also may include a planar bottom surface. Two planar side surfaces may extend between the bottom surface and the top surface. The side surfaces may be perpendicular to the bottom surface. The stepped portion may be parallel to the bottom surface. Ridges may be formed on the surface of the lens to limit an exit angle of light passing through the lens.

A reflector may be positioned between the output face and the lens, or may be positioned between the light source and the input face so that light from the light source reflects from the reflector and enters the input face.

In another aspect, a beamforming waveguide for a vehicle headlamp is formed from a solid block of material and has an input face, an output face, and a guide portion extending between the input face and the output face. The guide portion includes a top surface having a first stepped portion that forms a thickness profile to control an output beam pattern of the waveguide. The guide portion further includes a second stepped portion and an inclined portion that forms a transition between the first stepped portion and the second stepped portion.

Embodiments may include one or more of the following features. The guide portion may have a uniform cross-section along a length of the guide portion from the input face to the output face. The guide portion also may include a planar bottom surface and two planar side surfaces extending between the bottom surface and the top surface. The side surfaces may be perpendicular to the bottom surface. The first and second stepped portions may be parallel to the bottom surface.

In another aspect, a vehicle headlamp includes a beamforming waveguide formed from a bundle of optical conduits. The waveguide has an input face, an output face, and a guide portion extending between the input face and the output face. A light source is positioned at the input face of the beamforming waveguide. A lens is positioned at the output face so that light output by the beamforming waveguide passes through the lens to provide vehicle forward illumination.

In another aspect, a vehicle headlamp includes a light source configured to produce light. A lens allows a portion of the light to pass through the lens to produce a headlamp beam. A beamforming wedge moves between a first position and a second position. The wedge is formed from a piece of solid material. An actuator moves the wedge between the first position for producing a low beam and the second position for producing a high beam.

Embodiments may include one or more of the following features. In the first position, the wedge may be positioned in an area between the lens and the light source, and in the second position, the wedge may be essentially removed from the area between the lens and the light source. The wedge may have a triangular cross-section in a plane perpendicular to the lens. The wedge may have a low beam portion and a high beam portion.

In the first position, the low beam portion of the wedge may be positioned in an area between the lens and the light source, and in the second position, the high beam area of the wedge may be positioned in the area between the lens and the light source. The high beam portion may vary in thickness across a surface thereof to produce a desired beam pattern. The high beam portion may have facets on a surface thereof to produce a desired beam pattern.

Other features and advantages will be apparent from the following detailed description, including the drawings, and from the claims.

BRIEF DESCRIPTION OF THE DRAWINGS

FIG. 2 shows a hybrid headlamp subsystem.

FIG. 3 shows a hybrid headlamp subsystem with a movable lens.

FIGS. 4A–4G show headlamp beam forming structures.

FIGS. 6A–6F show waveguide outputs modulated with electromechanical or liquid crystal light valves.

FIGS. 11A–11F show various embodiments of a cup holder illumination component.

FIG. 15 is a cross-section view of an epoxy-coated optical waveguide.

FIGS. 16A–16C are cross-section views of non-tapered and tapered waveguide inputs.

FIGS. 17A and 17B are cross-section views of waveguide sections having integrated installation components and an integrated output structure.

FIG. 18 shows a leaky waveguide bend and focusing lens.

FIGS. 19A and 19B show cross-section views of optical manifolds.

DESCRIPTION

Figure 1:
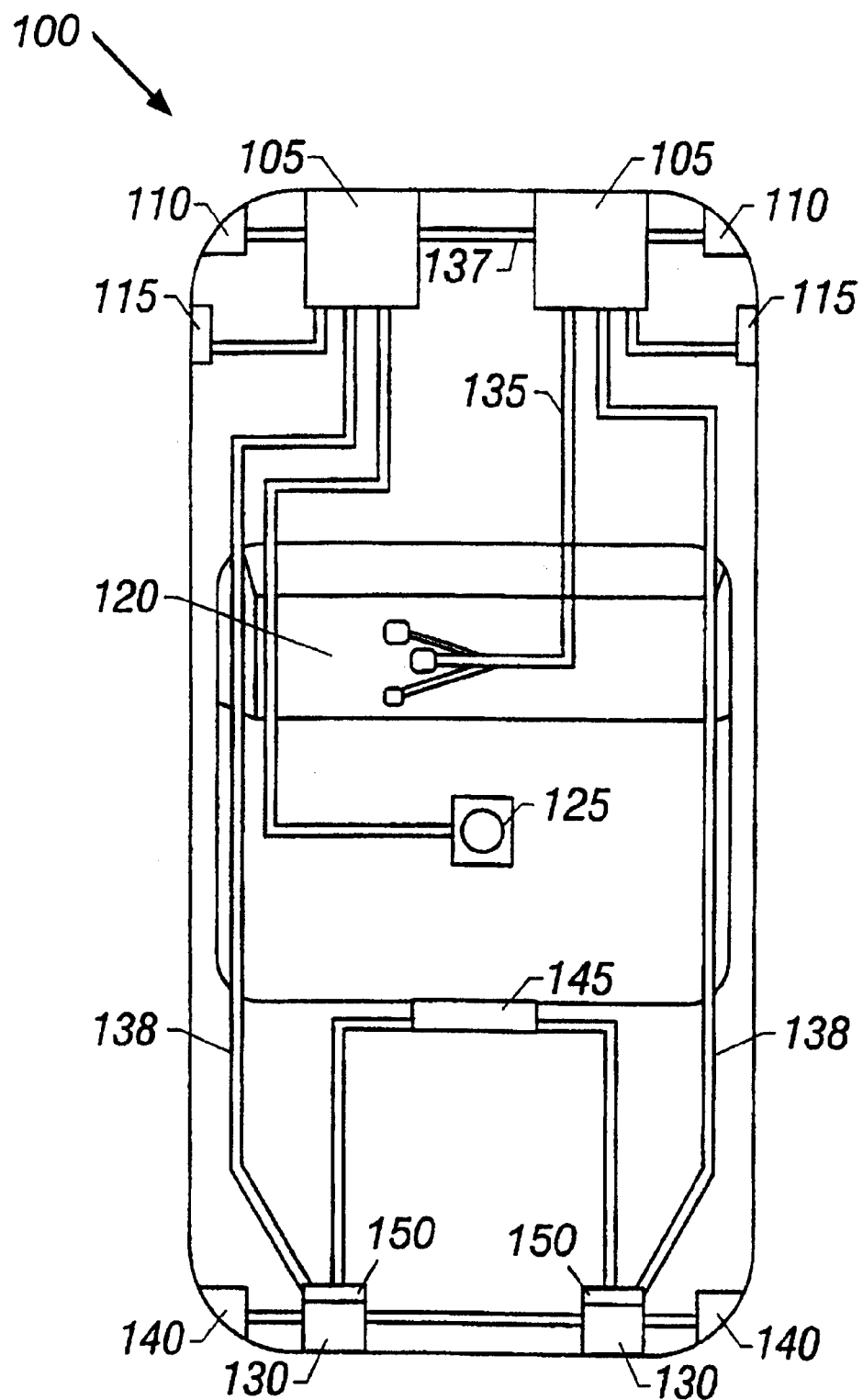
FIG. 1 is a block diagram of a vehicle distributed lighting system with hybrid lighting subsystems.

Referring to FIG. 1, a vehicle distributed lighting system (DLS) 100 includes hybrid headlamp subsystems 105, respective front and rear turn signal subsystems 110 and 140, and hybrid tail light subsystems 130. The hybrid headlamp subsystems 105 provide primary forward illumination for the vehicle. The headlamp subsystems 105 are also light sources for other exterior lights, such as front turn signals of the subsystems 110 and side markers 115, as well as interior lights, such as dashboard lights 120 and dome lights 125. These other lights are connected to the headlamp subsystems by optical waveguides 135 or optical fibers. Similarly, the tail light subsystems 130 provide light for rear turn signal subsystem 140 and a center high mounted stop light (CHMSL) 145. The subsystems of the DLS are interconnected so that the light source of one subsystem serves as a redundant light source for another subsystem.

The DLS incorporates different types of optical waveguide structures to distribute light throughout the vehicle. These include joints, elements with epoxy coatings, pinched end collector portions, integrated installation snaps, integrated input optics and integrated output lenses. The DLS also includes waveguide structures to provide illumination to portions of the vehicle interior, including cup holders, assist grips, and storage pockets.

FIG. 2 illustrates a hybrid headlamp subsystem 105. The subsystem includes a light source 205 that may be implemented using, for example, a high-intensity discharge (HID) lamp. Light produced by the light source 205 is collected by a reflector 210 and directed through a lens 215 to provide the primary forward illumination for the vehicle. The reflector may be implemented as a parabolic or complex reflector.

The hybrid headlamp subsystem 105 provides both high beam and low beam illumination. To this end, the subsystem may employ a number of different beam forming techniques, as shown in FIGS. 3–5. For example, FIG. 3 shows a simple Fresnel lens 305 that is moved by an actuator 310 between a high beam position and a low beam position. The movement of the lens 305 shifts the position of the "hot spot" (i.e., the area of most concentrated light) of the headlamp beam in the far field between the appropriate positions for the high and low beams. Other portions of the beam also will shift as the lens 305 moves. In addition to the lens 305 shown, additional lenses or other optical elements (such as wedges) may be used to control the beam pattern.

Figure 4A:
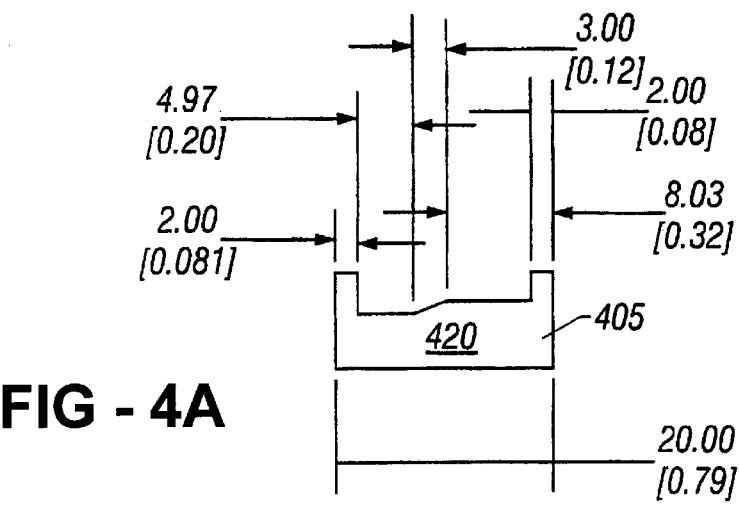
Figure 4B:
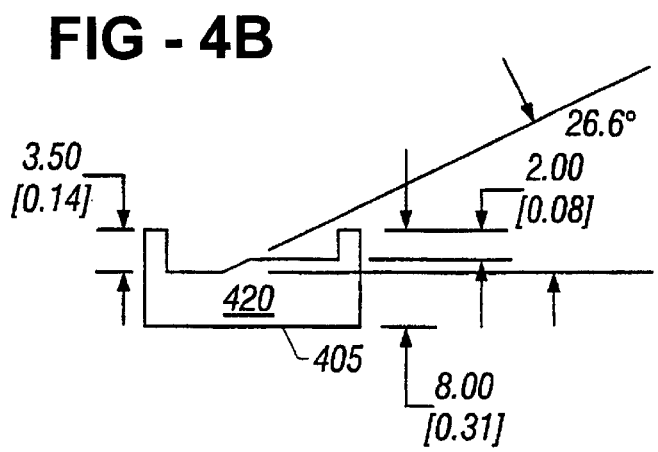
Figure 4C:
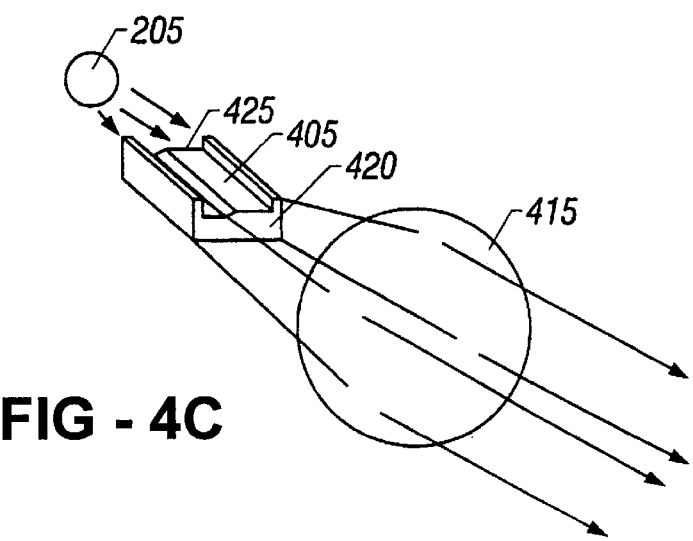
Figure 4D:
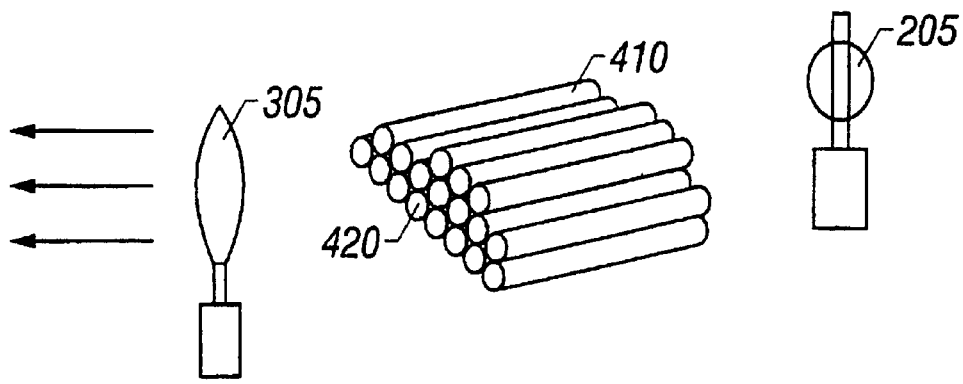
Figure 5:
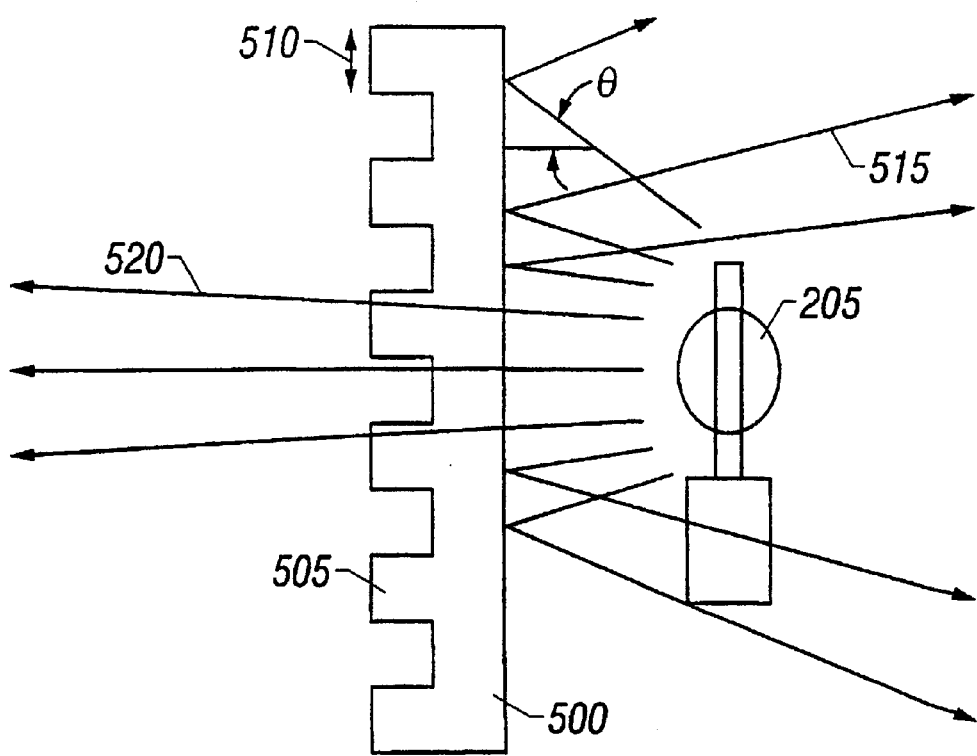
FIG. 5 shows a light source with a diffusion grating.

FIGS. 4A–4G show the use of beamforming structures, such as a solid molded form 405 (FIGS. 4A–4C), a bundle of plastic or glass fibers 410 (FIG. 4D), or a solid molded wedge (FIGS. 4F–4G), to generate a desired headlamp beam pattern. As shown in FIGS. 4A and 4D, light from a light source 205 passes through a form 405 or bundle 410 and then passes through a focusing lens 415 or 305. The shape of the output end 420 of the solid form 405 or bundle 410, in conjunction with the properties of the focusing lens 415 or 305, determines the beam pattern in the far field.

To increase light collection efficiency, the shape of the input end 425 of the solid form may be configured to act as a collector element to receive light from a light source. A reflector, similar to that shown in FIGS. 2 and 3 may focus light from the light source and direct the light toward the input of the beamforming structure.

Alternatively, as shown in FIG. 4E, the beamforming structure may be positioned between the light source and a reflector 430. In such a configuration, light 435 from the light source 205 enters the input face 425 of the solid form 405 (a fiber bundle 410 may also be used), passes through the form 405 and is transmitted from the output face 420. The light 435 then is reflected from the reflector 430 and output by the headlamp. A lens 415 may be positioned at the output, as shown in FIG. 4E, or between the form 405 and the reflector 430.

FIGS. 4A–4C show dimensions in mm [inches] of a thickness profile of a beamforming structure that might be used to achieve a desired beam pattern. Similarly, the bundle of fibers can be formed into a desired profile. The input or output ends of the fibers may be fused together. As with the implementation shown in FIG. 3, the lens 305 may be moved to shift the hot spot of the beam between high beam and low beam positions. The solid molded form 405 may be inexpensively manufactured using injection molding techniques. The form 405 may be replaced in order to implement alternative beam patterns or to meet differing specifications or regulations.

Figure 4F:
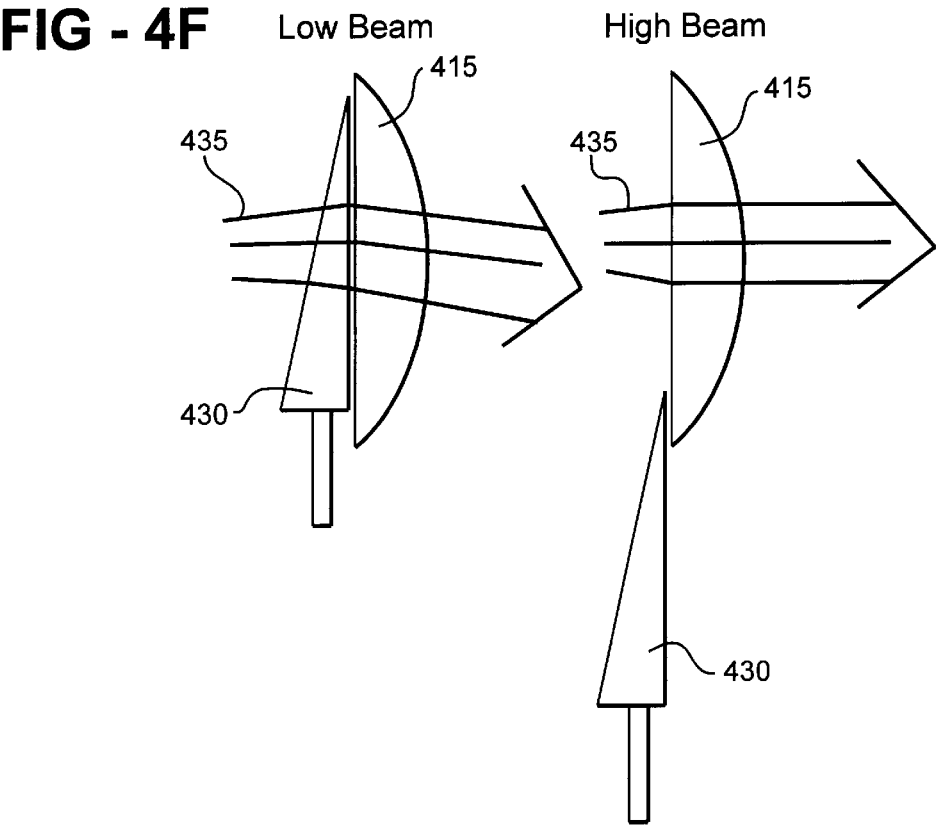

FIG. 4F shows a simple solid wedge 430 positioned on the side of a lens 415 facing the light source. Light 435 from the light source passes through the wedge 430 and is directed downward to provide a headlamp low beam. The wedge 430 is moved away from the lens 415 to allow the light 435 to pass directly through the lens 415 to provide a headlamp high beam. As FIG. 4F shows, in the high beam position, the lens is essentially removed from the area between the light source and lens, however, a small portion may remain in front of the lens. In this configuration, most of the light from the light source passes directly through the lens and bypasses the wedge 430.

Figure 4G:
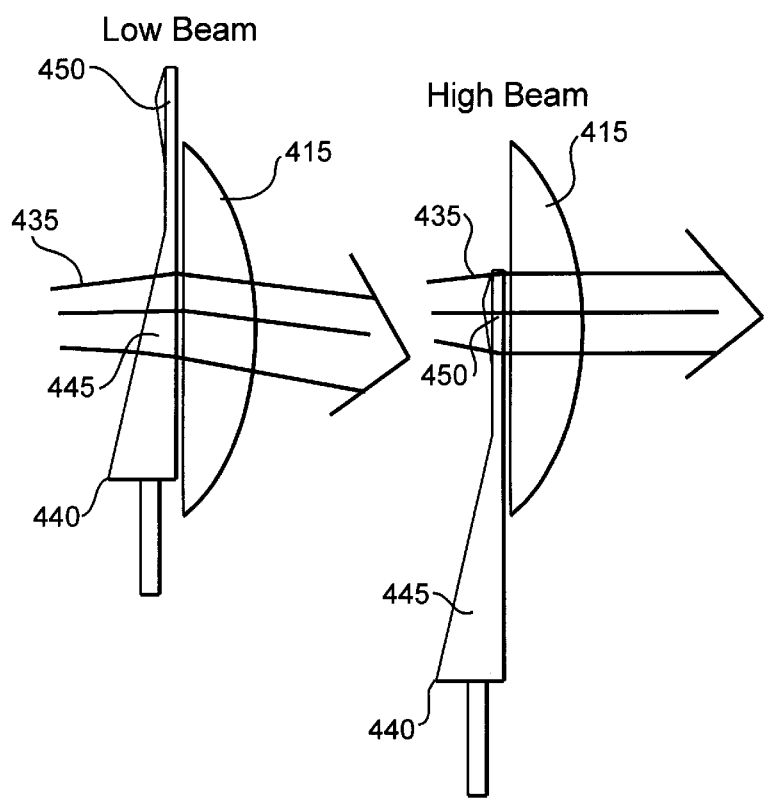

Similarly, FIG. 4G shows a complex wedge 440 having a low beam portion 445 and a high beam portion 450. The wedge 440 is positioned on the side of the lens facing the light source. Light 435 from the light source passes through the low beam portion 445 of the wedge 440 and is directed downward to form a headlamp low beam. In this position, the high beam portion 450 may cover a portion of the lens, however, most of the light 435 from the light source passes through the low beam portion 445 and the lens 415 and bypasses the high beam portion 450.

The wedge 440 is moved downward so that the high beam portion 450 of the wedge 440 is positioned between the light source and the lens. The high beam portion 450 may vary in thickness or have facets across its surface in order to produce a desired beam pattern. In addition, the position of the wedge 440 may be continually adjusted during driving to maintain the direction of the forward illumination relative to the road surface. The wedge may also have additional portions that produce other lighting patterns, such as peripheral or fog lighting.

FIG. 5 shows the use of a diffraction grating 500 to control the headlamp beam pattern (the diffraction grating may also be used for other lighting functions, such as stop lights and turn signals). The diffraction grating 500 includes essentially transparent material that has a series of ridges 505 on its surface. The width 510 of the ridges is approximately equal to the wavelength of the light produced by the light source 205. A portion 515 of the light passing through the diffraction grating 500 is reflected back toward the light source, with the size of the portion depending upon the exit angle ($\theta$) of the light ray. Some of the light 520 travelling in a direction close to perpendicular ($\theta=0°$) passes through the grating undisturbed. By limiting the exit angle ($\theta$) of the headlamp illumination, the grating 500 may provide, for example, a more focused headlamp beam in the far field. The grating 500 may be used alone or in conjunction with lenses 305, solid forms 405 or fiber bundles 410 described above to provide a desired headlamp beam pattern.

In addition to providing the primary forward illumination, the light source 205 acts as a light source for other parts of the system. As shown in FIG. 2, waveguides 135 having collector elements 220 at their ends are positioned close to the light source 205 to receive light and transmit the light to other locations in the vehicle, such as to provide turn signals, interior lighting, fog lights, and side markers. The waveguides 135 may also carry light to other lighting subsystems to provide redundancy, such as the opposite side headlamp or the tail lights. The number of collector elements 220 may be increased as necessary to supply light for other lighting functions. The collector elements 220 may be glass rods (such as Pyrex) with ends that are polished so as to be faceted or pinched. The pinched ends increase the acceptance angle of the collector element.

FIG. 2. shows a waveguide 225 that carries light from the source to a side marker light 115. The waveguide 225 may include colored plastic filters 230 to provide a desired output color (e.g., amber) for the side marker 115. This configuration eliminates the need for an electrical connection and light bulb in the side marker 115.

Another waveguide provides light to the turn signal subsystem 110. Alternatively, the turn signal subsystem 110 may include an independent light source and may use the input from the headlamp subsystem 105 for redundancy.

As shown in FIGS. 6A–6D, some implementations of the turn signal subsystem use an electromechanical modulator 605 (FIGS. 6A and 6B) while others use a liquid crystal light valve (LCLV) 610 (FIGS. 6C and 6D) to modulate the light produced by the turn signal. A plastic colored filter provides amber color for the turn signal. The use of a colored filter eliminates the need for light bulbs enclosed in cadmium-doped glass.

The electromechanical modulator 605, as shown in FIGS. 6A and 6B, includes an opaque shutter 615 that is moved between an ON (FIG. 6A) and OFF (FIG. 6B) position by a solenoid 620. In the ON position, the shutter 615 is moved away from the illumination path, so that essentially all of the light is transmitted. In the OFF position, the shutter 615 blocks the illumination path so that no light is transmitted. The use of an electromechanical modulator 605 with an amber-colored plastic filter provides a desirable aesthetic effect (i.e., the turn signal appears amber when ON but has no color when OFF).

The LCLV illustrated in FIGS. 6C and 6D has no mechanical components. This increases the reliability of the LCLV relating to systems that include mechanical components. The LCLV 610 has two states. In the OFF state (FIG. 6D) the LCLV 610 reflects or scatters most of the incident light. Alternatively, the LCLV 610 may absorb most of the incident light. In the ON state (FIG. 6C) the LCLV 610 becomes largely transparent (i.e., greater than 80% of incident light passes through the LCLV). The ratio of the light transmitted in the ON state relative to the light transmitted in the OFF state (i.e., the contrast ratio) is approximately 5:1, which meets SAE requirements for a turn signal. A contrast ratio of 5:1 also meets the SAE requirements for stop lights used as turn signals. An infrared reflecting mirror (not shown) may be used to shield the LCLV from infrared energy from the source, thereby increasing the expected life of the LCLV.

As shown in FIGS. 6E and 6F, LCLV modulators 610 may be combined with diffraction gratings 500 to improve the contrast ratio and achieve a desired beam pattern. As discussed above, light from the light source (waveguide 135) is scattered when the LCLV is OFF (FIG. 6F). The diffraction grating 500 lessens the amount of forward scattered light that is emitted. Focusing optics, such as lenses 630, may also be used to provide further beam pattern control.

Referring again to FIG. 1, waveguides or optical fibers also may carry light from the headlamp subsystem to other subsystems that have their own light sources, such as the opposite headlamp subsystem (waveguide 137) or the corresponding tail light subsystem (waveguide 138), to provide light source redundancy. When redundancy is employed and, for example, one of the headlamps fails, light from the operational headlamp will dimly illuminate the failed headlamp. This is safer for the operator of the vehicle than having only one operational headlamp. Redundancy also may be used to reduce the effects of failure of other lighting components. For example, an incandescent PC bulb may be used as a source for trunk lighting and may be connected to provide redundancy to interior reading lights.

Figure 7:
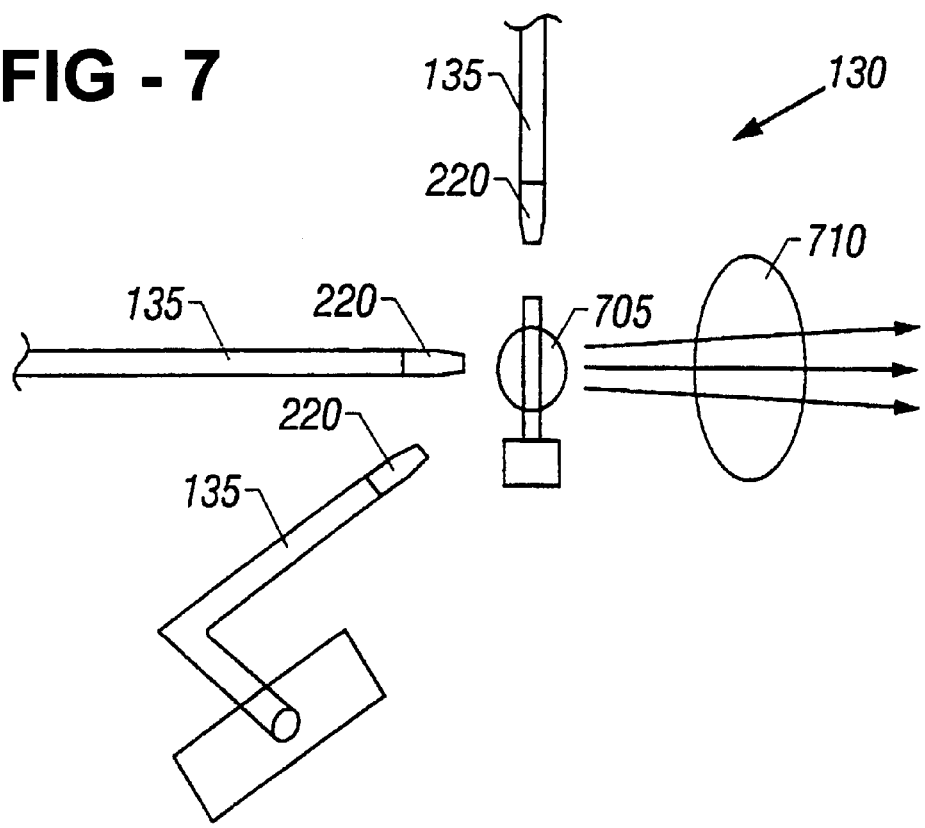
FIG. 7 shows a hybrid tail light subsystem.

The tail light subsystems 130 of FIG. 1 operate similarly to the headlamp subsystems. As shown in FIG. 7, a tail light subsystem 130 has a light source 705 that provides primary rear illumination through a lens 710. The light source 705 may be a HID lamp or another type of lighting source, such as an incandescent lamp, since the lighting requirement (in lumens) generally is less than the requirement for a headlamp. In general, an incandescent source is significantly less expensive than an HID source.

Figure 8:
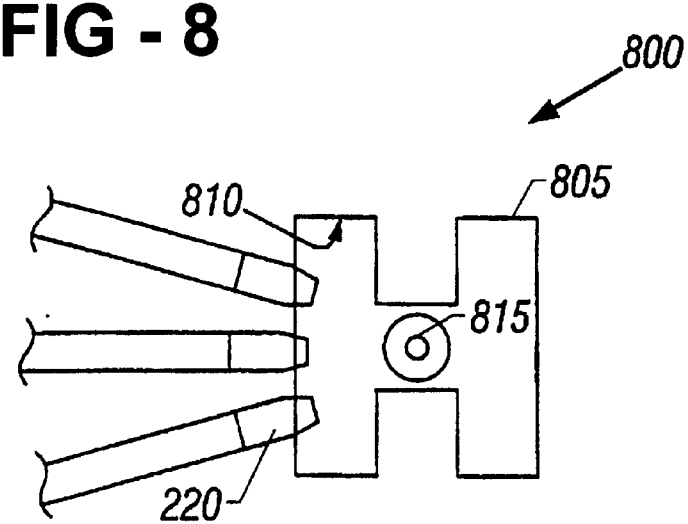
FIG. 8 shows a compact incandescent cartridge.

A compact incandescent cartridge 800, such as shown in FIG. 8, may be employed as the light source 705. The cartridge 800 includes a housing 805 having reflective, heat-dissipating interior surfaces 810. An incandescent bulb 815 is positioned in the center of the housing 805. Waveguide collector elements 220 are positioned around the light source. The incandescent cartridge 800 has a compact size, stays cool, and reduces lamp placement error, which increases efficiency. In addition, construction of the waveguide collector elements 220 from injection molding is easy and inexpensive. The cartridge 800 or similar incandescent sources may also be used as light sources elsewhere in the DLS, depending on lighting requirements. In addition, networks of cartridges 800 or incandescent sources may be interconnected to provide redundant light sources for interior or exterior lighting functions in the DLS.

Referring again to FIG. 7, waveguide collector elements 220 in the tail light subsystem are positioned close to the source 705 to receive light and transmit the light to other lighting elements, such as the rear turn signal subsytem 140, backup lights 150, and center high-mounted stop light (CHMSL) 145. A combination stop/rear turn signal light may be modulated with a LCLV 610, as discussed above with respect to the forward turn signals. The backup lights 150 and CHMSL 145, however, are modulated with electromechanical shutters 615, since they must be completely dark in the OFF mode.

Figure 9A:
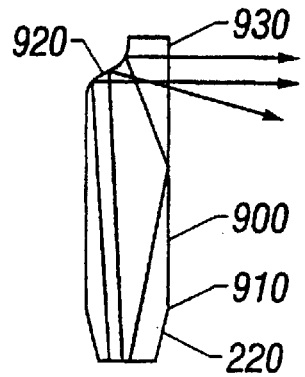
FIGS. 9A and 9B show a waveguide output bend for a tail light.
Figure 9B:
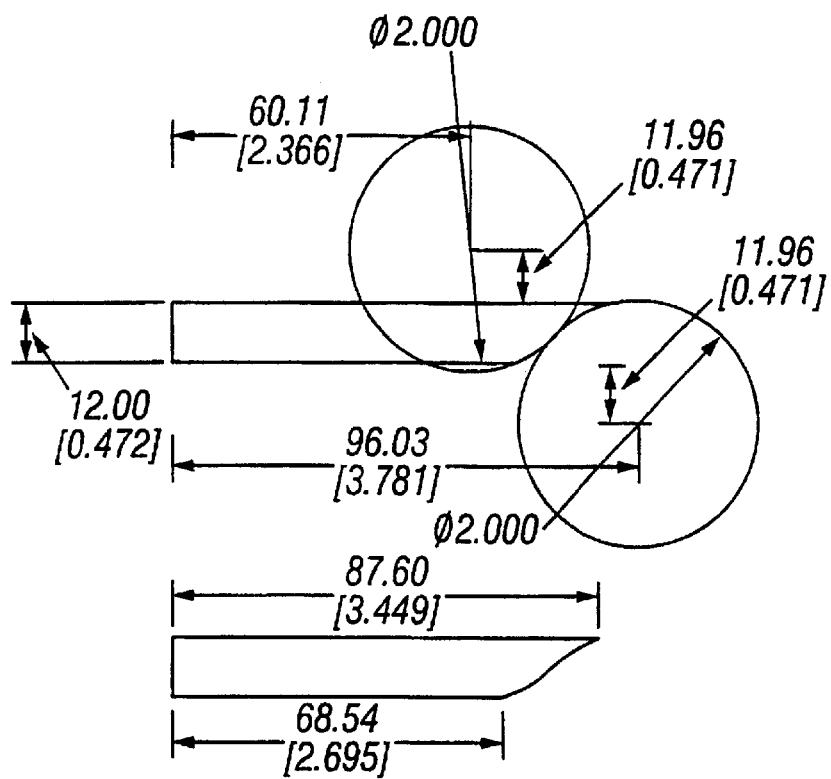

The rear turn signals subsystems 140 also may be implemented in the manner shown in FIGS. 9A and 9B. In particular, a waveguide section 900 may be used to provide a desired beam pattern for the rear turn signal. Light from a collector element 220 or an independent light source is received at the input 910 of the waveguide section 900 and is internally reflected by the surfaces of the waveguide as it propagates. The waveguide 900 includes a bend 920 immediately prior to the output 930. The outer surface of the bend 920 is s-shaped, which changes the distribution of light across the surface of output 930 and hence the far field beam pattern of the turn signal. The outer surface of the bend 920 may be coated with silver or aluminum to increase reflectivity. The top surface 925 also may serve as an output port. As an example, FIG. 9B shows dimensions in mm [inches] of a waveguide 900 that might be used to provide a desired beam pattern.

Figure 10A:
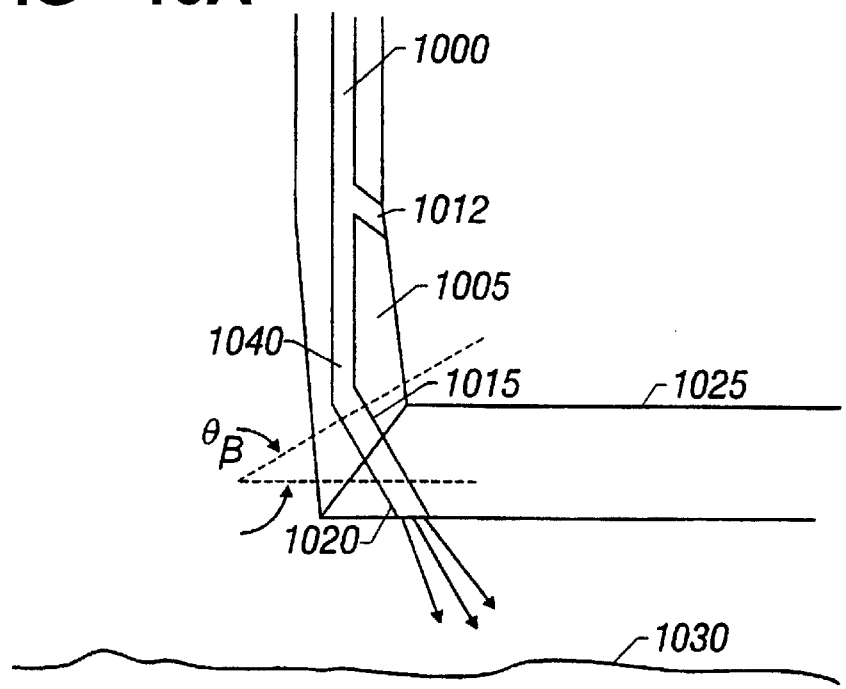
FIGS. 10A and 10B show a combination security/puddle light.
Figure 10B:
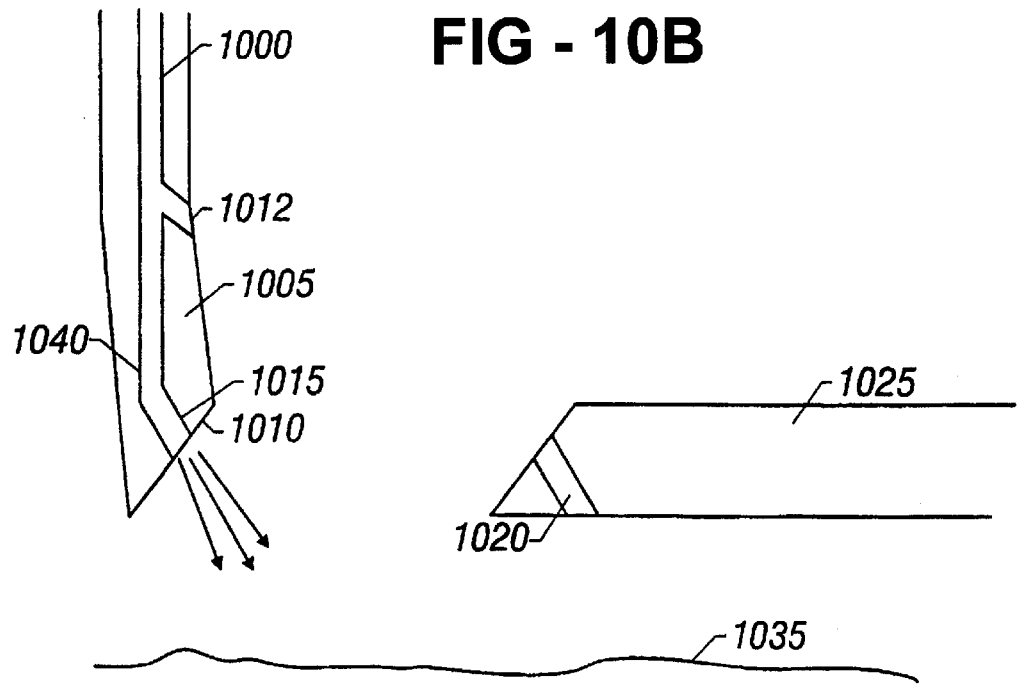

The DLS also may be used to provide other lighting functions. For example, a waveguide 1000 may be installed in the door 1005, as shown in FIGS. 10A and 10B, to provide a security/puddle light. The waveguide 1000 runs from a light source, such as the hybrid headlamp subsystem 105 (FIG. 1), to the bottom edge 1010 of the door 1005. The waveguide 1000 may have a lens formed at its output end. A waveguide branch 1012 may be used to implement a interior door light. When the door 1005 is closed, as in FIG. 10A, a door waveguide section 1015 connects to a waveguide 1020 that passes through the floor 1025. The floor waveguide 1020 provides a security light that illuminates the area 1030 underneath the vehicle. The ends of the floor waveguide 1020 may have integrally formed lenses. When the door 1005 is open, as in FIG. 10B, the door waveguide 1015 provides a puddle light that illuminates the ground 1035 between the open door and the vehicle. The bend 1040 in the door waveguide section 1015 may have a bend angle ($\theta_B$) of, for example, 20°. The bend 1040 helps to direct the output of the waveguide 1000 to the desired area. Alternatively, the security/puddle light may be implemented as a hybrid subsystem that has an independent light source. The independent light source may directly provide interior lighting for the vehicle in addition to being connected to the waveguide 1000 as a light source for the security/puddle light.

Another waveguide carries light from hybrid headlamp subsystem to the interior of the vehicle to provide, for example, dashboard lighting, dome lights, and reading lights. Waveguides also provide unique, aesthetically pleasing lighting effects for certain interior structures, such as cup holders, map pockets, and assist grips.

Figure 11A:
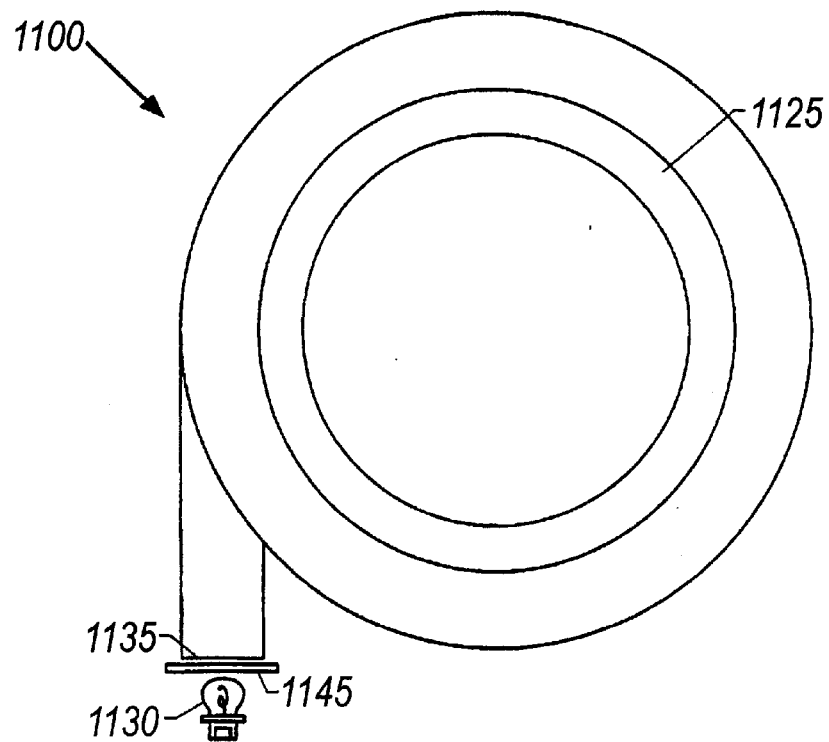
Figure 11B:
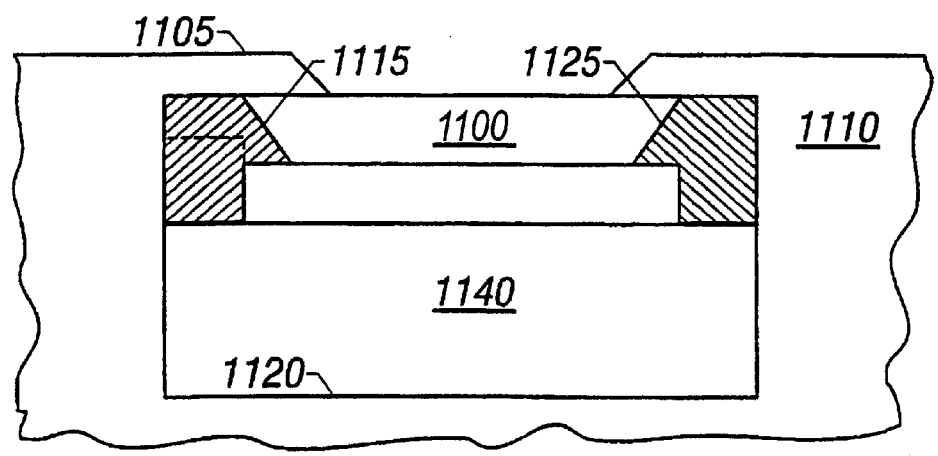

For example, as shown in FIGS. 11A and 11B, a ring-shaped waveguide element 1100 may be installed under the lip 1105 of a cup holder 1110. Although the shape of the waveguide 1100 in FIGS. 11A and 11B is circular, any shape may be used depending upon the shape and size of the cup holder 1100. The efficiency of the waveguide may be improved by selecting a ratio of the inner radius (r) of the waveguide relative to the width (w) of the waveguide. For example, a waveguide with an inner radius to waveguide width ratio (r/w) of 3:1 will lose less light than a ratio of 1:1 or 0.1:1.

The waveguide 1100 may have a protruding, angled upper region 1115 to reflect and/or transmit light downward toward the bottom 1120 of the cup holder 1110. The upper surface 1125 of the angled portion 1115 may be stippled and may be covered with a layer of opaque material to prevent leakage of light in the upward direction. A small incandescent bulb 1130 at the input 1135 of the waveguide is used as a source. A colored filter 1145 may be placed between the source 1130 and the input 1135 to achieve a desired illumination color. When illuminated, the interior 1140 of the cup holder 1110 glows faintly so as not to interfere with the driver's vision. The glowing illumination allows the occupants of the vehicle to discern the location of the cup holder 1110. Light for the waveguide 1100 also may be provided by a waveguide 135 connected to one of the lighting subassemblies.

Another embodiment of the cup holder illumination waveguide 1100 is shown in FIGS. 11C–11D. These "wishbone" shaped waveguides 1100 are configured for cup holders having a gap 1150 to accommodate a mug handle. Light for the waveguide 1100 enters the input 1135 and is split essentially equally to the two arms 1155 of the wishbone. The split in the waveguide 1100 may lead to a dark area in the illumination of the cup holder. Therefore, as shown in FIG. 11C, a web portion 1160 is included between the two arms 1155. The web portion may be thinner than the rest of the waveguide 1100 and provides additional illumination to the portion of the interior 1140 of the cup holder directly beneath the split in the wishbone.

Alternatively, as shown in FIG. 11D, a tab 1165 may extend downward from the split to reflect and/or transmit light toward the bottom of the cup holder. The tab 1165 has a generally rectangular cross-section and curves downward toward the bottom 1120 of the cup holder. The tab 1165 may be thinner than the rest of the waveguide 1100. As shown in FIG. 11E, the tab 1165 also may have a chamfered leading edge 1170.

Figure 11F:
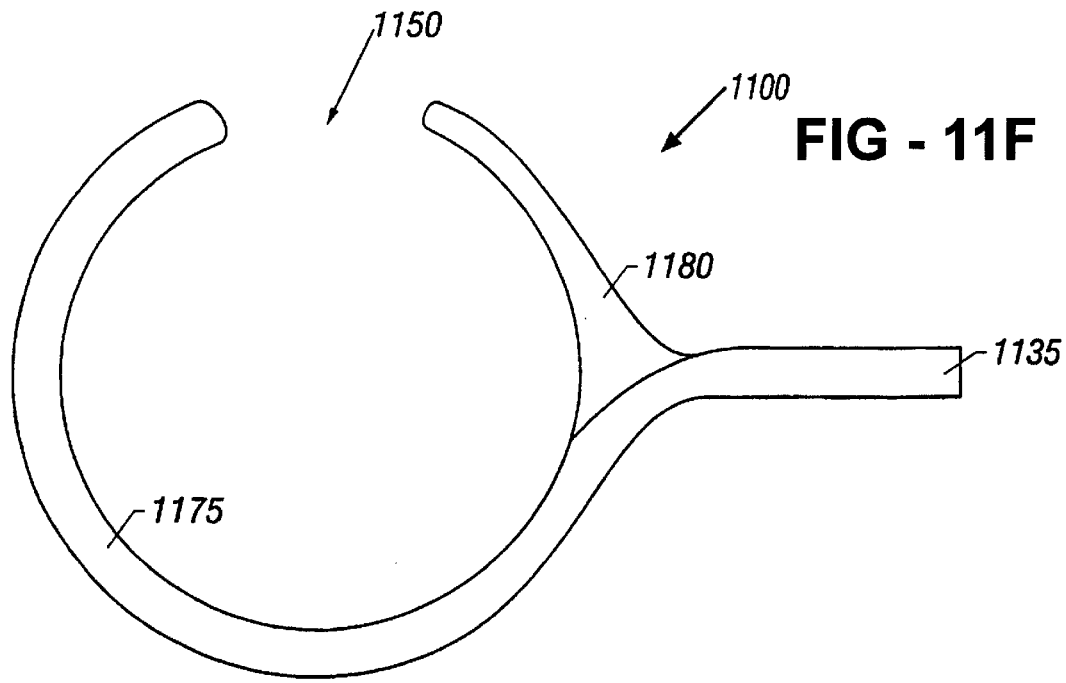

Yet another embodiment of the cup holder illumination waveguide 1100 is shown in FIG. 11F. As in the previous embodiment, the waveguide 1100 is configured for cup holders having a gap 1150 to accommodate a mug handle. Light enters the input 1135 and is split unequally between a primary arm 1175 and a secondary arm 1180. The secondary arm has a smaller cross-section, (i.e., is thinner and narrower than the primary arm 1175. Since the secondary arm 1180 is shorter than the primary arm 1175, there is less loss along its length. The smaller cross-section of the secondary arm 1180 allows less light to enter the secondary arm, which balances the light in the two arms 1175 and 1180 provides uniform illumination around the circumference of the cup holder.

Figure 12A:
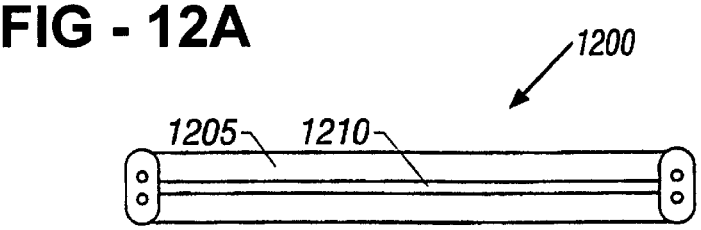
FIG. 12A is a rear view of a waveguide installed in a handgrip.
Figure 12B:
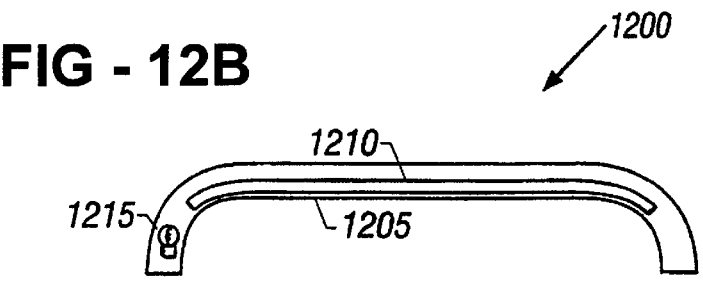
FIG. 12B is a cross-section view of a waveguide and light source installed in a handgrip.
Figure 12C:
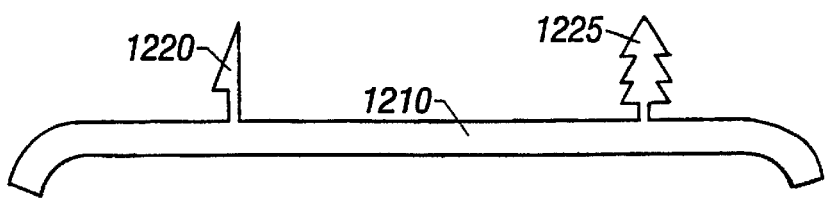
FIG. 12C shows a waveguide with integrated snaps for installation into a handgrip.

Similar structures may be used in the interior of a map pocket or, as shown in FIGS. 12A–12C, along the interior surface 1205 of an assist grip 1200. A length of waveguide 1210 is installed along the inner surface 1205. The waveguide includes bends 1212 at the ends to conform to the shape of the assist grip. A small incandescent bulb 1215 provides a light source. The bulb may be used in conjunction with a lens (not shown) to provide a courtesy light. Alternatively, the assist grip 1200 may be connected by a waveguide to another light source in the DLS. As shown in FIG. 12C, the waveguide 1210 may be formed with snaps 1220 and 1225 to make installation into the assist grip 1200 easier.

Figure 13:
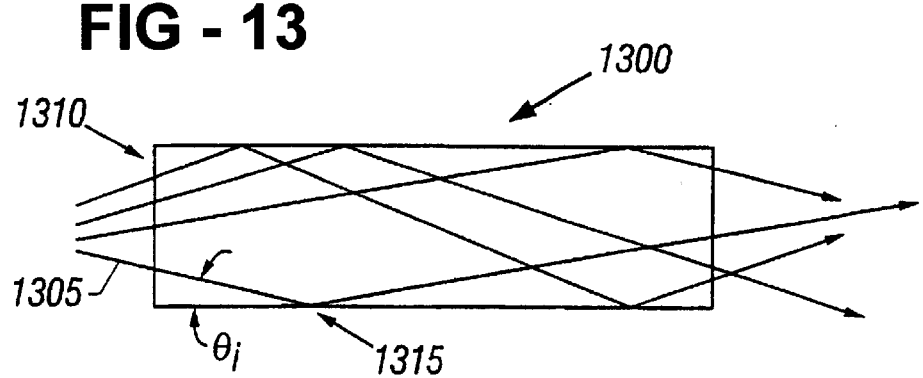
FIG. 13 is a cross-section view of an optical waveguide.

Different types of waveguide structures may be used in the DLS to transmit light from the sources to the lighting outputs. A basic waveguide, as shown in FIG. 13, may be formed from optically transparent material such as acrylic or glass. If the waveguide is formed from acrylic or a similar material, it can be manufactured using an injection molding process. The manufacture of waveguide elements using injection molding results in very low manufacturing costs compared to fiber optics. In addition, molded acrylic waveguide elements are more rigid than fiber optics, can be installed by robots, and generally do not require maintenance. Waveguide elements can also achieve smaller bend radii than fiber.

As shown in FIG. 13, a light ray 1305 that has entered through the input face 1310 proceeds through the waveguide 1300 until the light ray 1305 reaches an outer surface 1315 of the waveguide 1300, i.e. an interface between the material of the waveguide 1300 and air. At the outer surface 1315, light is reflected in accordance with Snell's law. If the angle of incidence ($\theta_i$) of the light ray 1305 at the outer surface 1315 is less than a threshold referred to as the critical angle ($\theta_c$), then the light ray 1305 is reflected internally, with no light escaping. This phenomenon is known as total internal reflection. The critical angle depends on the index of refraction of the material of which the waveguide is composed relative to that of the material surrounding the waveguide, (e.g., air). For example, if the waveguide were made from acrylic, which has an index of refraction of approximately 1.5, and surrounded by air, the critical angle, $\theta_c$, would be:

$$\theta_c = \arcsin(n_a/n_b) = \arcsin(1/1.5) = 41.8$$

where $n_a$ is the index of refraction of air (1.0) and $n_b$ is the index of refraction of acrylic (1.5).

Figure 14A:
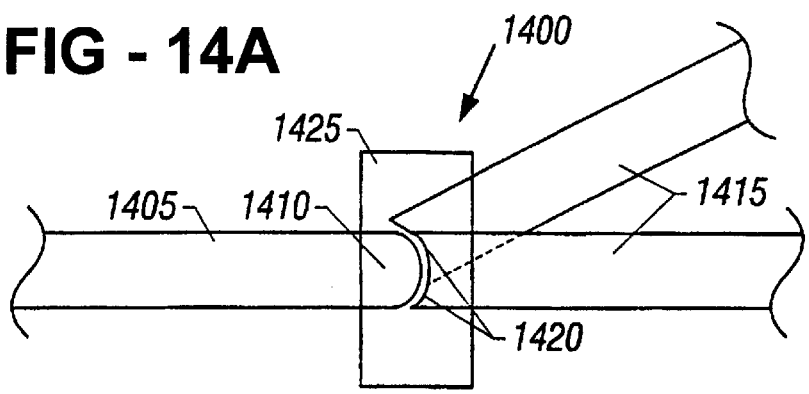
FIGS. 14A and 14B are side and bottom views of a waveguide joint.
Figure 14B:
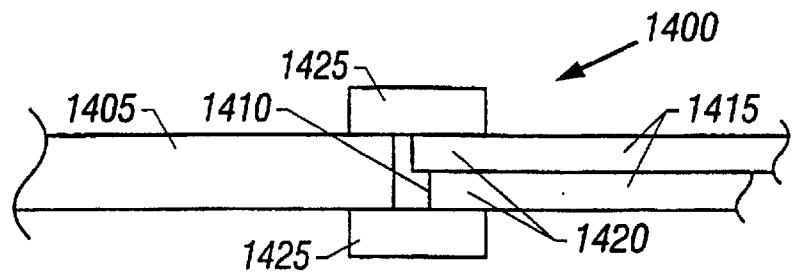

Referring to FIGS. 14A and 14B, a waveguide joint 1400 may be used to distribute light in the DLS. For example, the joint may be used to provide light to a door of the vehicle. The waveguide joint 1400 has a trunk section 1405 with a convex curved end 1410. Branch sections 1415 having convex curved ends 1420 adjoin the trunk section 1405. The branch sections may be held in place by a plastic band 1425 surrounding the joint region or by epoxy or snaps. Light input to the trunk section 1405 is essentially split among the branches 1415. The branches 1415 may be positioned to carry light to different sections of the vehicle. With this configuration, it is possible to reconfigure the branches 1415 in the event of design changes. Epoxy that has an index of refraction approximately equal to that of the waveguide, i.e., that is index-matched, may be used to hold the branches 1415 in place. The joint 1400 may have only a single branch 1415 that is used to change the direction of the trunk 1405 or to provide a hinged connection. A hinged connection using the joint 1400 may be installed, for example, in a car door. Index-matched fluid may be used to lubricate and reduce discontinuity at the interface between the trunk 1405 and the branch 1415, which will reduce the loss through the joint 1400.

FIG. 15 shows a waveguide core 1500 encased in a layer of epoxy 1505. The epoxy coating 1505 may be applied by dipping the waveguide core 1500 (which may be formed, for example, from acrylic) in a reservoir of epoxy and allowing the coating to dry or by spraying. The epoxy 1505 has a lower index of refraction than the waveguide 1500. The distribution of light in the waveguide peaks at the center of the waveguide and diminishes toward the edges of the waveguide. Overall, a significant portion of the light is confined within the waveguide core 1500.

The epoxy coating 1505 offers several advantages compared to an uncoated waveguide. For example, contaminants on the surface of an uncoated waveguide can cause light at the waveguide/air interface to be scattered and transmitted outside of the waveguide instead of being internally reflected, which increases loss in the uncoated waveguide. The epoxy layer 1505 increases the distance between the contaminants and the waveguide core 1500, which reduces the amount of light that reaches the waveguide/air interface. If the epoxy does not adhere to the waveguide, then the resulting air gap also will help to keep the light separated from contaminants on the surface of the waveguide structure. In addition, plastic coatings can be applied to the outside surfaces 1520 of the epoxy layer, and clamps and other fixtures can be attached to the outside surfaces 1520 with reduced effect on light transmission through the waveguide 1500. One also could use a waveguide formed from polycarbonate (which has an index of refraction of 1.58) with an outer coating of epoxy (which typically has an index of refraction of 1.4 or less). Alternatively, one could use a waveguide having a glass core and an outer coating having a lower index of refraction.

As shown in FIGS. 16A–C, a waveguide 1600 may have a pinched end that acts as a collector element 1605. The collector element 1605 increases the acceptance angle ($\alpha$) of the waveguide 1600 and thereby increases light collection efficiency. The end of the waveguide 1600 may be pinched in two dimensions to form an essentially trapezoidally shaped collector element 1605. The collector element 1605 may be formed on the end of a waveguide 1600 having a cross-section that is rectangular, round, or other shapes.

For example, FIG. 16A shows a waveguide 1610 without a pinched end. Light 1615 from a light source 1620 enters the waveguide 1610 at an angle of 45°. At the input face 1625, the light is bent in accordance with Snell's Law to form an angle of 26° with respect to a direction perpendicular to the input face 1625. The light reaches the outer edge 1627 of the waveguide at an angle of 26° and is confined within the waveguide by internal reflection.

FIG. 16B shows a waveguide 1600 with a pinched end. Light enters the input face at an angle of 55°. Hence, the acceptance angle of the pinched waveguide 1600 can be made greater than the acceptance angle of the waveguide 1610 without the pinched end. At the input face 1625, the light is bent to form an angle of 31° with respect to a direction perpendicular to the input face 1625. The light reaches the outer edge 1627 of the waveguide at an angle of 26° (since the inclined walls 1630 of the pinched portion are angled inward by 5°) and is confined within the waveguide by internal reflection.

As shown in FIG. 16C, the pinched end of the waveguide 1600 may be formed so that an excess of material at the tip of the waveguide 1600 bulges outward to form a lens 1635 with a desired focal length. The lens 1635 focuses received light, further increasing the acceptance angle of the waveguide 1600.

The waveguides may be formed as a set of standard components that may be easily interconnected and used as building blocks for different applications. For example, FIG. 17A shows waveguides 1700 and 1705 having integrated installation elements, such as snaps 1710 and detents 1715. Snaps 1710 can be formed during the injection molding of the waveguide 1700 and provide a convenient means for securing the waveguide 1700 within the vehicle. The snaps are sized and angled to minimize light loss through the snap. For example, the snap may form a 60° angle with the waveguide (toward the direction that light is travelling through the waveguide). The vehicle may have brackets to receive the snaps 1710 or a screw may be inserted into a snap 1710 to secure the waveguide to a mounting surface. The detents 1715 enable the waveguide 1700 to be securely connected to another waveguide 1705 having an integrated claw structure 1720. Each waveguide may be formed with a detent 1715 at one end and a claw structure 1720 at the other.

FIG. 17B shows waveguides with integrated connection elements. A waveguide 1740 may have a key 1745 formed at one end. The key 1745 is configured to mate with a socket 1750 of another waveguide 1755. These connection elements may cause a loss of approximately 4% at each interface, however, the connection elements increase the ease with which waveguide components can be installed. Index-matched epoxy or fluid may be used at the interface to secure the connection and reduce losses.

In addition to the installation and connection elements, the waveguide 1700 widens at one end into an output element 1725 having a convex curved surface 1730. The curved surface 1730 of the output element 1725 essentially acts as a lens to provide a desired light output characteristic. The output element 1725 may form an illumination element for the vehicle, e.g., a courtesy light in the door of a vehicle. A portion of the widened waveguide end may be eliminated, leaving an air gap 1735, while maintaining desired output characteristics. The air gap 1735 decreases the weight and cost of the waveguide 1700.

Another configuration for an output element is shown in FIG. 18. A waveguide 1800 has a bend 1805 that is configured to allow a portion of the light travelling in the waveguide to escape at the bend 1805. A lens 1810 may be used to focus the light to form a desired beam pattern. The amount of light released at the bend 1805 (or reflected back toward the input) can be controlled by determining the inner radius (r) of curvature of the bend 1805 relative to the width (w) of the waveguide 1800. For example, a bend with a inner bend radius to waveguide width ratio (r/w) of 3:1 will result in a loss of less than 5% of the total light in the waveguide (the losses including light released at the bend and light reflected back toward the input). A bend ratio of 1:1 will result in a loss of approximately 30–35%, and a bend ratio of 0.1:1 will result in a loss of approximately 65–70%. Not all of the light lost in the waveguide enters the lens, however the amount of light entering the lens will be proportional to the amount of light released at the bend.

An optical manifold 1900, as shown in FIGS. 19A and 19B, is another useful building block for a DLS. Light enters the optical manifold 1900 through one or more inputs 1905 and is split to one or more of the output arms 1910. Alternatively, light may enter through one or more output arms 1910 and exit through the inputs 1905. The output arms 1910 may branch off at multiple points from the optical manifold in multiple directions to direct light to other subsystems of the DLS in various locations within the vehicle. The size of the output arms 1910 and their locations determines the proportion of the light input to the manifold that is split to each arm.

As shown in FIG. 19B, the optical manifold 1900 may include integrated output elements 1915. The output element 1915 may be lens-like structures that provide lighting functions within the vehicle, such as a reading lights or dashboard lights. The manifold 1900 may have multiple input 1905 and output arms 1910 and a portion 1920 where light from the various inputs is combined. Each input and output may use colored filters to achieve desired lighting effects.

Other embodiments are within the scope of the following claims.

What is claimed is:

1. A vehicle headlamp comprising:

a beamforming waveguide formed from a block of solid material, the waveguide having an input face, an output face, and a guide portion extending between the input face and the output face, a light source positioned at the input face of the beamforming waveguide, and a lens positioned at the output face so that light output by the beamforming waveguide passes through the lens to provide vehicle forward illumination, wherein the forward illumination produced by the vehicle headlamp has a beam pattern that is determined by the shape of the beamforming waveguide and lens.

2. The vehicle headlamp of claim 1, wherein the guide portion has a uniform cross-section along a length of the guide portion from the input face to the output face.

3. A vehicle headlamp comprising:

a beamforming waveguide formed from a block of solid material, the waveguide having an input face, an output face, and a guide portion extending between the input face and the output face, a light source positioned at the input face of the beamforming waveguide, and a lens positioned at the output face so that light output by the beamforming waveguide passes through the lens to provide vehicle forward illumination, wherein the guide portion comprises a top surface having a first stepped portion that forms a thickness profile to control an output beam pattern of the waveguide.

4. The vehicle headlamp of claim 3, wherein the guide portion further comprises:
a second stepped portion, and
an inclined portion that forms a transition between the first stepped portion and the second stepped portion.

5. The vehicle headlamp of claim 3, wherein the input and output faces of the waveguide are planar surfaces and the stepped portion is perpendicular to the input face and the output face.

6. The vehicle headlamp of claim 3, wherein the guide portion further comprises:
a planar bottom surface, and
two planar side surfaces extending between the bottom surface and the top surface, the side surfaces being perpendicular to the bottom surface,
wherein the stepped portion is parallel to the bottom surface.

7. The vehicle headlamp of claim 1, wherein the lens comprises ridges formed on a surface of the lens to limit an exit angle of light passing through the lens.

8. A vehicle headlamp comprising:
a beamforming waveguide formed from a block of solid material, the waveguide having an input face, an output face, and a guide portion extending between the input face and the output face,
a light source positioned at the input face of the beamforming waveguide, and a lens positioned at the output face so that light output by the beamforming waveguide passes through the lens to provide vehicle forward illumination,
wherein a reflector is positioned between the output face and the lens.

9. A vehicle headlamp comprising:
a beamforming waveguide formed from a block of solid material, the waveguide having an input face, an output face, and a guide portion extending between the input face and the output face,
a light source positioned at the input face of the beamforming waveguide,
a lens positioned at the output face so that light output by the beamforming waveguide passes through the lens to provide vehicle forward illumination, and
a reflector positioned relative to the light source and the input face so that light from the light source reflects from the reflector and enters the input face.

10. A beamforming waveguide for a vehicle headlamp, the waveguide being formed from a solid block of material and having an input face, an output face, and a guide portion extending between the input face and the output face, the guide portion comprising:
a top surface having a first stepped portion that forms a thickness profile to control an output beam pattern of the waveguide,
a second stepped portion, and
an inclined portion that forms a transition between the first stepped portion and the second stepped portion.

11. The beamforming waveguide of claim 10, wherein the guide portion has a uniform cross-section along a length of the guide portion from the input face to the output face.

12. The beamforming waveguide of claim 10, the guide portion further comprising:
a planar bottom surface, and
two planar side surfaces extending between the bottom surface and the top surface, the side surfaces being perpendicular to the bottom surface,
wherein the first and second stepped portions are parallel to the bottom surface.

13. A vehicle headlamp comprising:
a beamforming waveguide formed from a bundle of optical conduits, the waveguide having an input face, an output face, and a guide portion extending between the input face and the output face,
a light source positioned at the input face of the beamforming waveguide, and
a lens positioned at the output face so that light output by the beamforming waveguide passes through the lens to provide vehicle forward illumination,
wherein the optical conduits each have an output end with the output ends being grouped together to form the output face of the waveguide and wherein the forward illumination produced by the vehicle headlamp has a beam pattern that is determined by the shape of the beamforming waveguide and lens.

14. The vehicle headlamp of claim 13, wherein the guide portion has a uniform cross-section along a length of the guide portion from the input face to the output face.

15. A vehicle headlamp comprising:
a beamforming waveguide formed from a bundle of optical conduits, the waveguide having an input face, an output face, and a guide portion extending between the input face and the output face,
a light source positioned at the input face of the beamforming waveguide, and
a lens positioned at the output face so that light output by the beamforming waveguide passes through the lens to provide vehicle forward illumination,
wherein the conduits are arranged to form a top surface along the guide portion, the top surface having a first stepped portion that forms a thickness profile to control an output beam pattern of the waveguide.

16. A vehicle headlamp comprising:
a beamforming waveguide formed from a bundle of optical conduits, the waveguide having an input face, an output face, and a guide portion extending between the input face and the output face,
a light source positioned at the input face of the beamforming waveguide, and
a lens positioned at the output face so that light output by the beamforming waveguide passes through the lens to provide vehicle forward illumination,
wherein the lens comprises ridges formed on a surface of the lens to limit an exit angle of light passing through the lens.

17. A vehicle headlamp comprising:
a lit source configured to produce light,
a lens positioned to allow a portion of the light to pass through the lens to produce a headlamp beam,
a beamforming wedge moveable between a first position and a second position, the wedge being formed from a piece of solid material, and
an actuator configured to move the wedge between the first position for producing a low beam and the second position for producing a high beam,
wherein in the first position, the wedge is positioned in an area between the lens and the light source, and in the second position, the wedge is essentially removed from the area between the lens and the light source.

18. A vehicle headlamp comprising:

a light source configured to produce light, a lens positioned to allow a portion of the light to pass through the lens to produce a headlamp beam, a beamforming wedge moveable between a first position and a second position, the wedge being formed from a piece of solid material, and an actuator configured to move the wedge between the first position for producing a low beam and the second position for producing a high beam, wherein the wedge has a triangular cross-section in a plane perpendicular to the lens.

19. A vehicle headlamp comprising:

a light source configured to produce light, a lens positioned to allow a portion of the light to pass through the lens to produce a headlamp beam, a beamforming wedge moveable between a first position and a second position, the wedge being formed from a piece of solid material, and an actuator configured to move the wedge between the first position for producing a low beam and the second position for producing a high beam, wherein the wedge has a low beam portion and a high beam portion.

20. The vehicle headlamp of claim 19, wherein in the first position, the low beam portion of the wedge is positioned in an area between the lens and the light source, and in the second position, the high beam area of the wedge is positioned in the area between the lens and the light source.

21. The vehicle headlamp of claim 19, wherein the low beam portion of the wedge has a triangular cross-section in a plane perpendicular to the lens.

22. The vehicle headlamp of claim 19, wherein the high beam portion varies in thickness across a surface thereof to produce a desired beam pattern.

23. The vehicle headlamp of claim 19, wherein the high beam portion comprises facets on a surface thereof to produce a desired beam pattern.

* * * * *

UNITED STATES PATENT AND TRADEMARK OFFICE
CERTIFICATE OF CORRECTION

PATENT NO. : 6,186,650 B1
DATED : February 13, 2001
INVENTOR(S) : George R. Hulse and Lloyd Keith Bucher It is certified that error appears in the above-identified patent and that said Letters Patent is hereby corrected as shown below:

Column 4,
Line 42, after "shown in Figs." delete "4A" and insert therefor -- 4C --.

Column 14,
Line 54, before "source", delete "lit" and insert therefor -- light --.

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,186,650 B1  
DATED        : February 13, 2001  
INVENTOR(S)  : George R. Hulse and Lloyd Keith Bucher It is certified that error appears in the above-identified patent and that said Letters Patent is hereby corrected as shown below:

Column 12,
Lines 48-50, delete "wherein the forward illumination produced by the vehicle headlamp has a beam pattern that is determined by the shape of the beamforming waveguide and lens." and insert therefor -- wherein the output face has first and second stepped portions, with the first stepped portion being wider than the second stepped portion. --.

Column 14,
Lines 16-19, after "waveguide and wherein" delete "the forward illumination produced by the vehicle headlamp has a beam pattern that is determined by the shape of the beamforming waveguide and lens." and insert therefor -- the output face has first and second stepped portions. --.

Signed and Sealed this

Second Day of December, 2003

JAMES E. ROGAN  
*Director of the United States Patent and Trademark Office*